US007228936B2

(12) United States Patent
Wyse et al.

(10) Patent No.: US 7,228,936 B2
(45) Date of Patent: Jun. 12, 2007

(54) MOBILE SCAFFOLDING BRAKING SYSTEM

(76) Inventors: Steven J. Wyse, 82 Pin Oak, Archbold, OH (US) 43502; James L. Wyse, 13324 County Rd. 12, Middlebury, IN (US) 46540

( * ) Notice: Subject to any disclaimer, the term of this patent is extended or adjusted under 35 U.S.C. 154(b) by 397 days.

(21) Appl. No.: 10/710,427

(22) Filed: Jul. 9, 2004

(65) Prior Publication Data

US 2006/0027423 A1 Feb. 9, 2006

(51) Int. Cl.
*E04G 3/28* (2006.01)
*B60B 33/00* (2006.01)

(52) U.S. Cl. .......................... 182/17; 182/12; 188/1.12

(58) Field of Classification Search ............ 182/12–17, 182/115–119; 280/32.5, 47.16, 43.22; 188/5, 188/4 R, 1.12; 16/35 R See application file for complete search history.

(56) References Cited

U.S. PATENT DOCUMENTS 1,912,509 A * 6/1933 Ballard ........................ 182/15
2,527,639 A * 10/1950 Loether ...................... 16/35 R
2,827,215 A 3/1958 Burg et al.
3,112,010 A 11/1963 Mihaliak
3,232,375 A 2/1966 Warthen
3,236,331 A 2/1966 Gren
3,409,105 A * 11/1968 Clinton ...................... 16/35 R
3,422,922 A 1/1969 Aiken
3,429,398 A 2/1969 Reynolds et al.
3,520,382 A * 7/1970 Halsey et al. ................. 182/13
3,566,990 A 3/1971 Fredricks
3,858,688 A 1/1975 Galloway
3,930,548 A 1/1976 Wallraff
4,035,864 A * 7/1977 Schroder .................... 16/35 R
4,053,025 A * 10/1977 Slusarenko .................. 182/16
4,088,202 A 5/1978 Castello
4,275,797 A 6/1981 Johnson
4,302,023 A 11/1981 Kiesz
4,475,611 A 10/1984 Fisher
4,534,447 A 8/1985 Champigny
4,807,719 A 2/1989 Burkstrand et al.
4,911,263 A * 3/1990 Kuperman .................. 182/13

(Continued)

OTHER PUBLICATIONS

Prior art brake as shown in Winter Construction's Equipment Internet publication for "Q-BRAKE" device (published at www.qbrake.com at least as early as Dec. 20, 2002).

*Primary Examiner*—Hugh B. Thompson, II
(74) *Attorney, Agent, or Firm*—Hovey Williams LLP

(57) ABSTRACT

A mobile scaffold (10) having bi-axially rotatable casters (22–28) and including brake assemblies (30 and 32) associated with the casters (22–28) is disclosed. The inventive brake assemblies (30,32) enable an elevated worker to selectively control the mobility of the scaffold (10) and each broadly includes shiftable brake stop subassemblies (74 and 76), a brake housing (72) adjustably connected to a respective scaffold frame (12,14) and shiftably connected to the brake stop subassemblies (74,76), and an actuator (78) adjustably connected to the housing (72) and configured to shift the brake stop subassemblies (74,76) into and out of braking positions. When in the braking position, the brake stop subassemblies (74,76) prevent the respective casters (22–28) from rotating about both axes. The actuator includes cables (180,182) for interconnecting brake stop subassembly and the handle in one embodiment and a plunger (308,406) in other embodiments. Preferred alternative embodiments are disclosed that include pivotal linkage subassemblies (328,430) for intercommunicating the plunger and the brake stops.

73 Claims, 11 Drawing Sheets

U.S. PATENT DOCUMENTS

| | | | | |
|---|---|---|---|---|
| 4,944,366 | A | 7/1990 | Pryor et al. | |
| 5,217,090 | A | 6/1993 | Billington, III et al. | |
| 5,474,151 | A | 12/1995 | Yonahara | |
| 5,555,954 | A | 9/1996 | Swiderski | |
| 5,588,500 | A | 12/1996 | Yonahara | |
| 5,722,506 | A | 3/1998 | Takai | |
| 6,371,243 | B1 | 4/2002 | Donaldson et al. | |
| 6,471,003 | B2 | 10/2002 | Wyse | |
| 6,761,247 | B2 | 7/2004 | Wyse | |
| 6,863,155 | B2 * | 3/2005 | Wyse et al. | 182/118 |
| 6,865,775 | B2 * | 3/2005 | Ganance | 16/35 R |
| 6,871,892 | B2 | 3/2005 | Holman | |
| 6,880,672 | B2 | 4/2005 | Imberi | |

* cited by examiner

FIG. 1
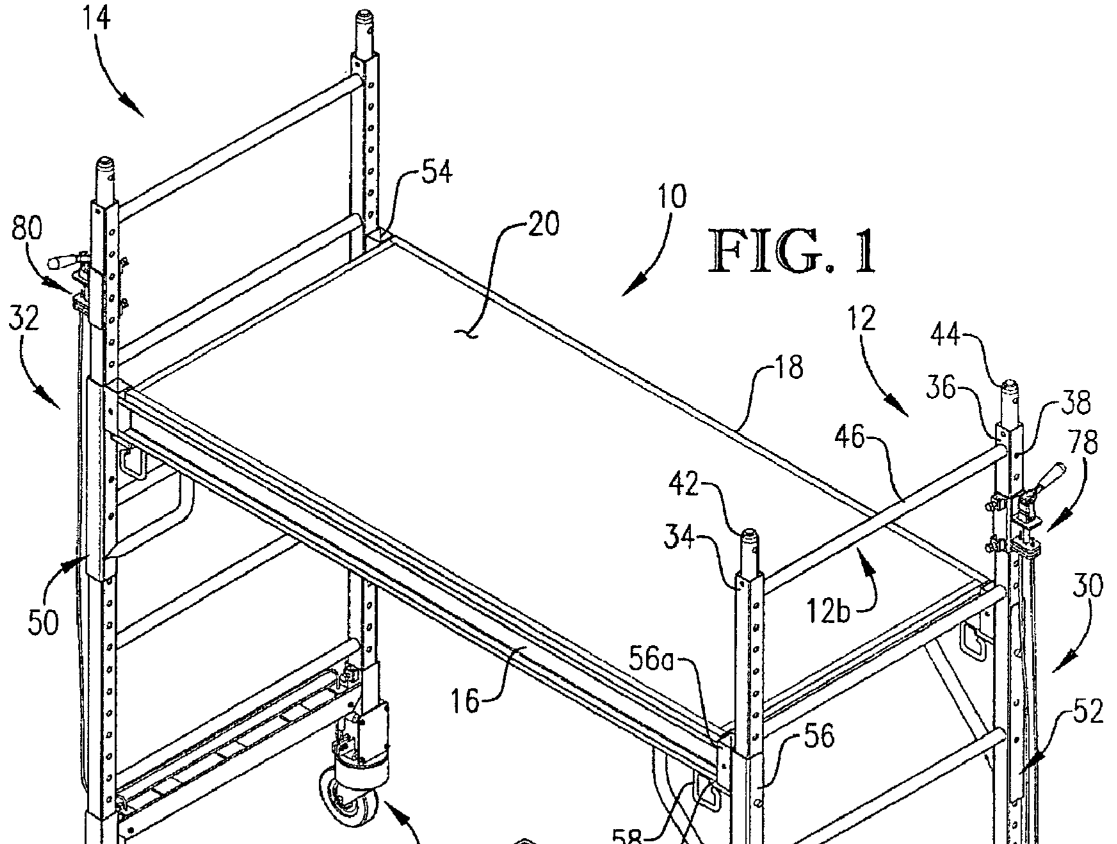
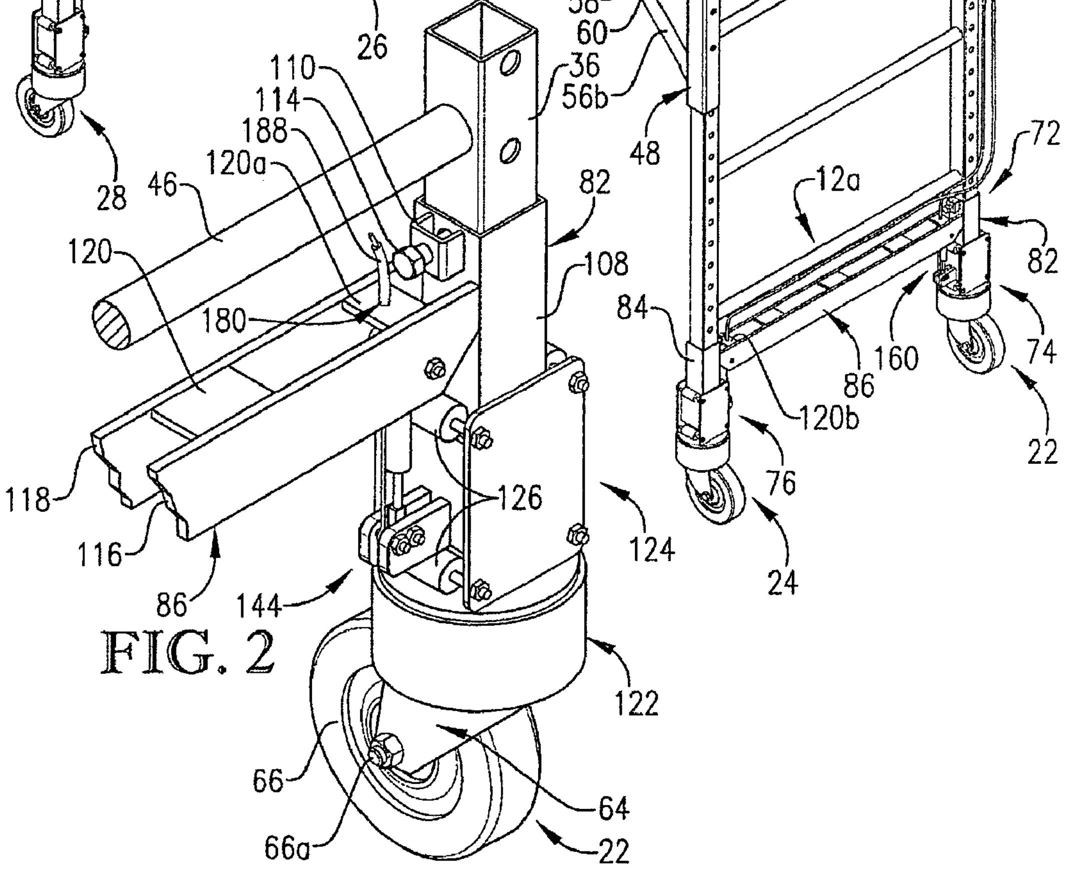
FIG. 2

MOBILE SCAFFOLDING BRAKING SYSTEM

BACKGROUND OF THE INVENTION

1. Field of the Invention

The present invention relates generally to mobile scaffolding. More specifically, the present invention concerns a mobile scaffolding brake that can be activated from the support platform and when activated generally prevents both rolling and swivelling of the caster wheel. The inventive brake provides a secure restraint of the scaffolding and enables a worker supported on the scaffolding platform to selectively prevent unsafe and inadvertent motion of the scaffolding while the worker is supported thereon.

2. Discussion of Prior Art

It is known in the art to utilize scaffolding to provide an elevated work platform to elevate a worker above a floor or ground surface to complete a task (e.g., painting, drywall finishing, etc.). The scaffolding utilized to provide the elevated work platform is often mobile scaffolding that can be quickly and easily moved from one working position to the next. For example, it is known in the art to support a scaffolding frame with one or more casters that enable the assembled scaffolding to be rolled along the floor or ground surface between working positions. However, it is desirable to prevent the scaffolding from moving when one or more workers are supported thereon.

It is known in the art to provide a scaffolding caster with a brake for selectively preventing the scaffolding from moving. These prior art caster brakes utilize a brake stop that engages the caster wheel and thereby prevents rolling rotation of the wheel. These prior art caster brakes typically include a two-piece housing, with the wheel supported by one of the housing pieces and the brake stop supported by the other. The housing pieces are pivotal relative to one another so that the wheel can be pivoted into contact with the brake stop. One of the housing pieces serves as a foot-activated handle for selectively causing the wheel to be pivoted into engagement with the brake stop. In this manner, the weight of the scaffolding supported by the caster works to maintain the locking engagement between the wheel and the stop.

These prior art caster brakes are problematic and have several undesirable limitations. Several of these problems have been described in Applicants' copending Application for U.S. patent Ser. No. 10/271,634, entitled MOBILE SCAFFOLDING BRAKE, filed Oct. 15, 2002 (hereinafter "the '634 Application"), which is hereby incorporated by reference herein. In addition to the problems identified in the '634 Application, the prior art caster brakes enable the scaffolding an undesirable range of motion when the brakes are activated. For example, when the prior art caster brakes are activated, the caster wheels are still enabled to pivotally rotate—i.e., to "swivel"—relative to the scaffolding frame. Swiveling of the caster wheels is problematic as the caster wheels can re-orient in the direction of an applied force, such as when a third party on the ground inadvertently bumps into the scaffolding, which undesirably allows the scaffold to move in the force direction. This problem is compounded by the common occurrence of only one of the caster wheels having the brake activated, therefore allowing the scaffolding to swing, for example, to pivot around the swiveling, single brake-activated caster wheel. In this regard, the prior art caster brakes are problematic in that each of the four brakes must be separately and manually activated. Such a requirement is undesirable to workers with limited time to complete a job, particularly where the consequences of not activating more than one caster brake could be severe.

SUMMARY OF THE INVENTION

The present invention provides an improved scaffolding brake that does not suffer from the problems and limitations of the prior art brakes detailed above. The inventive brake can be activated from the support platform and when activated generally prevents both rolling and swivelling of the caster wheel. The improved brake provides a more secure restraint of the scaffolding than the prior art caster brakes as well as enables a worker supported on the scaffolding platform to selectively prevent unsafe and inadvertent motion of the scaffolding while the worker is supported thereon. In a preferred embodiment, a plurality of caster wheels can be locked by activating a single actuator.

A first aspect of the invention concerns a mobile scaffold including a first frame vertically elongated between first and second ends, and a first caster. The first caster includes a first caster housing rotatably coupled to the frame adjacent the first end and a first wheel rotatably coupled to the caster housing. The scaffold includes a brake assembly connected to the frame. The brake assembly includes a first shiftable brake stop that is shiftable into and out of a braking position, wherein the stop engages the wheel and the brake assembly is spaced from the caster housing.

A second aspect of the invention concerns a mobile scaffold including a first frame vertically elongated between first and second ends and a first caster. The first caster includes a first caster housing rotatably coupled to the frame adjacent the first end and a first wheel rotatably coupled to the caster housing. The scaffold also includes a brake assembly connected to the frame. The brake assembly includes a first brake stop that presents an enclosed wall that defines an inner chamber. The stop is shiftable into and out of a braking position, wherein the stop engages the wheel and at least a portion of the caster housing is received within the inner chamber and spaced from the wall.

A third aspect of the invention concerns a mobile scaffold including a frame vertically elongated between first and second ends and a wheel coupled to the frame adjacent the first end. The wheel is rotatable about a central wheel axis and an upright axis, wherein the upright axis is substantially transverse to the central wheel axis. The scaffold also includes a brake assembly fixed to the frame. The assembly includes a brake stop that is shiftable into and out of a braking position, wherein the stop engages the wheel so that the wheel is generally prevented from rotating about the central wheel and upright axes.

A fourth aspect of the invention concerns a brake assembly for use with a mobile scaffold that includes a frame presenting upper and lower ends, and first and second wheels coupled to the frame near the lower end. The wheels are each rotatable about a first axis and a second axis that is substantially transverse to the first axis. The brake assembly includes a housing connectable to the frame, a first shiftable brake stop fixedly connected to the housing, and an actuator configured to cause the stop to shift into and out of a braking position. In the braking position, the stop engages the first wheel and prevents it from rotating about said first and second axes.

Other aspects and advantages of the present invention will be apparent from the following detailed description of the preferred embodiment and the accompanying drawing figures.

BRIEF DESCRIPTION OF THE DRAWING FIGURES

Several embodiments of the invention are described in detail below with reference to the attached drawing figures, wherein:

FIG. 1 is a perspective view of a mobile scaffolding constructed in accordance with a preferred embodiment of the present invention and including a pair of improved brake assemblies, each being associated with a pair of the four casters;

FIG. 2 is an enlarged fragmentary perspective view of the scaffolding illustrated in FIG. 1 showing a brake stop subassembly of one of the brake assemblies for braking one of the casters;

Figure 15:
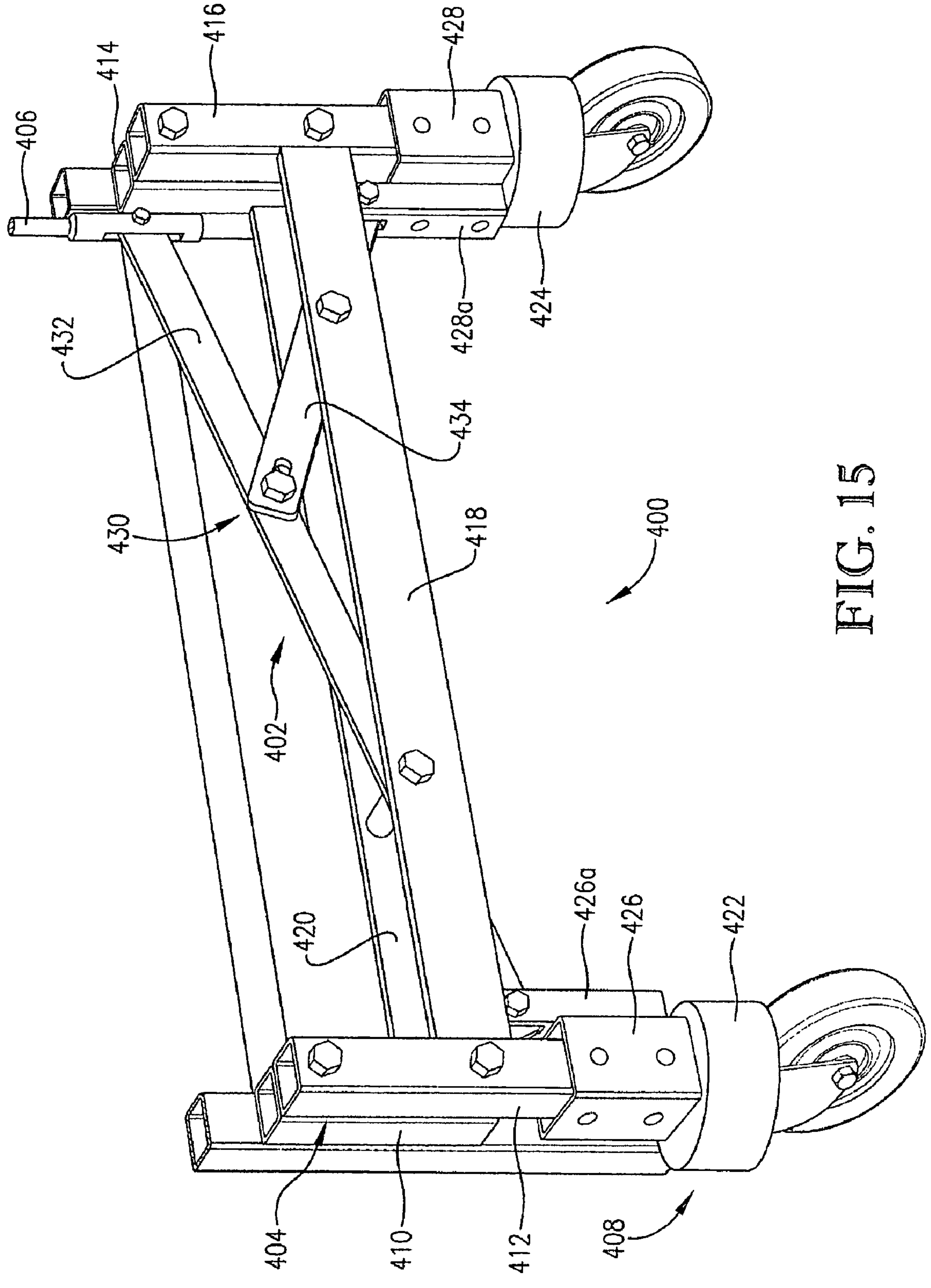
Figure 16:
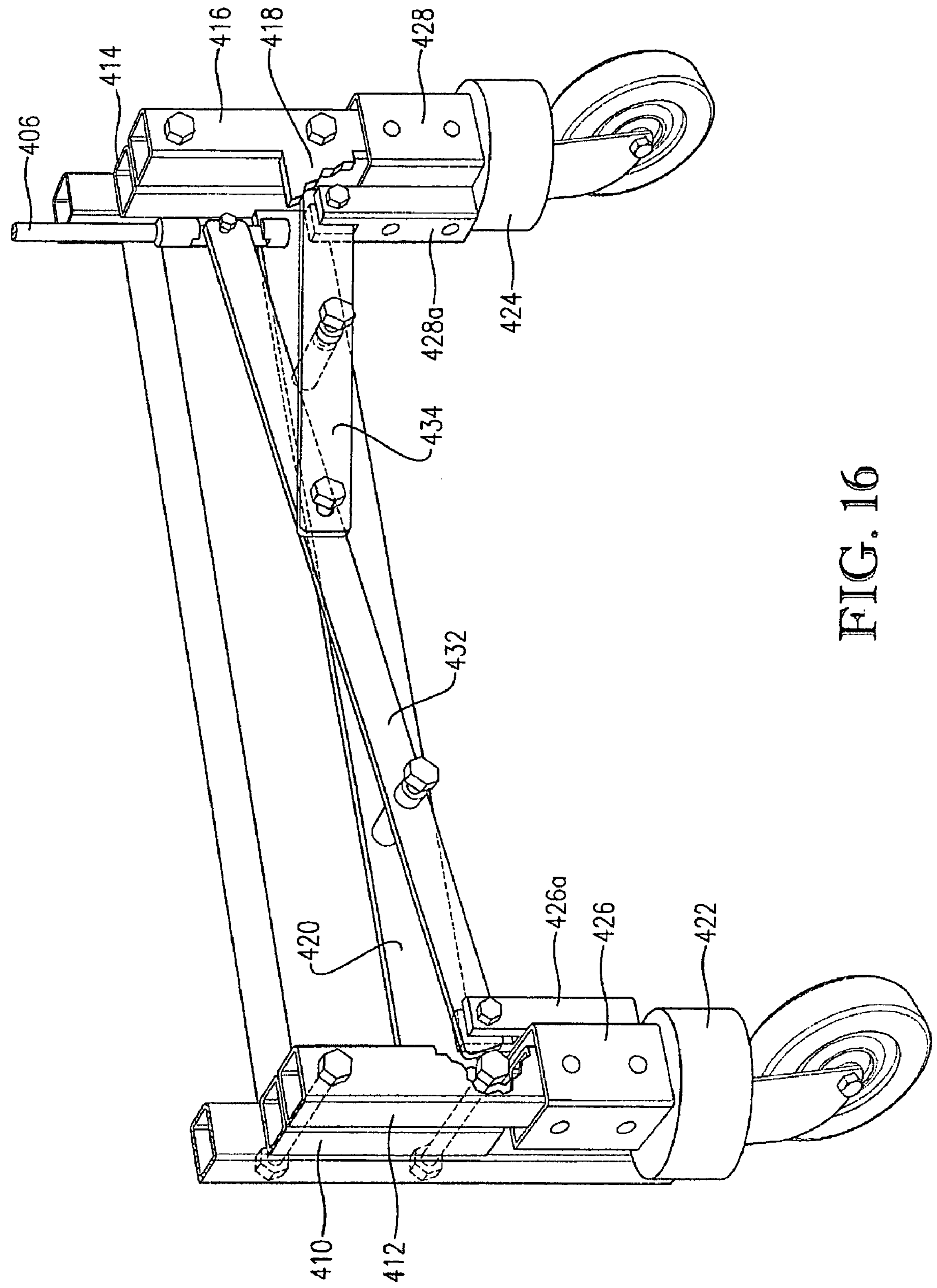

FIG. 15 is a perspective view of a mobile scaffolding constructed in accordance with a second preferred alternative embodiment of the present invention with parts cut away and showing parts of an improved brake assembly associated with a pair of the casters with the brake assembly shown in the braking position; and FIG. 16 is a perspective view of the scaffolding similar to FIG. 15 with parts cut away and with the brake assembly shown in the release position.

DETAILED DESCRIPTION OF THE PREFERRED EMBODIMENTS

FIG. 1 illustrates a mobile scaffolding 10 constructed in accordance with the principles of a preferred embodiment of the present invention and configured for elevating a worker (not shown) above a base surface, such as the ground. The illustrated scaffolding 10 utilizes a pair of rollable ladder-type frames to support a vertically-adjustable platform therebetween. However, the principles of the present invention are not limited to this scaffolding configuration and equally apply to virtually any type of scaffolding so long as the scaffolding supports an elevated worker and is movable (e.g., rollable, etc.). Additionally, the principles of the present invention are also applicable to other rollable structures that support an elevated load, such as wheeled carts or mobile ladders or the like. The illustrated scaffolding 10 broadly includes a pair of frames 12,14, a pair of vertically adjustable cross-beams 16 and 18 interconnecting the frames 12,14, a platform 20 supported by the cross-beams 16,18, four casters 22, 24, 26, and 28 rollably supporting the frames 12,14, respectively, and a pair of brake assemblies 30 and 32, each connected to a corresponding one of the frames 12,14, for securely locking the caster wheels 22,24 and 26,28, respectively.

In more detail, each of the frames 12,14 is configured to elevate the platform 20 vertically above the floor or ground surface and support the platform 20 once elevated. The frames 12,14 are virtually identically configured, therefore, only the frame 12 will be described in detail with the understanding that the frame 14 is similarly constructed. The frame 12 includes a pair of spaced apart vertically extending support posts 34 and 36. Each of the posts 34,36 are generally tubular in configuration presenting a hollow, generally square shaped cross section. For purposes that will subsequently be described, a plurality of spaced apertures 38 are formed in each of the posts 34,36 and extend through the respective post 34,36 to form an axially aligned pin-receiving passageway. As further described below, the lower ends of each of the posts 34,36 include an end cap, such as the end cap 40 shown on the post 36 in FIG. 3, configured to securely receive a respective one of the casters 22,24. Formed in the upper end of each of the posts 34,36 is a corresponding coupling shaft 42 and 44, respectively. Each of the shafts 42,44 is configured to removably receive various attachment components, such as guard rails, another frame member, etc. Fixed to each of the posts 34,36 and extending horizontally therebetween, are a plurality of rung members 46. The rungs 46 are spaced from one another and configured to enable the worker to climb up and down the rungs (e.g., in order to reach and exit the platform 20). The frame 12 defines a first, lower end 12*a* adjacent the end caps 40 and a second, upper end 12*b* adjacent the shafts 42,44 (see FIG. 1).

One exemplary frame is disclosed in U.S. Letters Pat. No. 6,471,003, issued Oct. 29, 2002, entitled UTILITY SCAFFOLDING HAVING SAFETY FEATURES (sharing a common inventor with the present application and hereinafter "the Wyse '003 patent"), which is hereby incorporated by reference herein as is necessary for a full and complete understanding of the present invention. However, the frame could be variously constructed and configured. For example, the frame need not utilize a tubular construction and need not be a ladder-type frame.

The platform 20 defines a generally flat work surface that is supported horizontally between the frames 12 and 14 on the cross beams 16,18 and is vertically adjustable between the upper and lower ends of the frames 12,14. Although not shown, the illustrated work surface 20 is preferably coupled to the beams 16,18 by a plurality of transverse pins and preferably includes rail pins and platform clips that can be pivoted into a locking position once the surface is placed on the beams 16,18 to prevent the surface 20 from dislodging from the transverse pins. Exemplary transverse pins, rail pins, and clips are disclosed in the Wyse '003 patent previously incorporated herein by reference. The illustrated beams 16,18 further each include a pair of corresponding bracket assemblies 48,50 and 52,54, respectively, that associate the corresponding beam 16,18 with each of the frames 12,14. The paired bracket assemblies 48,50 and 52,54 include assemblies that are mirror images of each other, but otherwise each of the assemblies 48,50,52,54 are virtually identically configured and therefore only the bracket assembly 48 will be described in detail with the understanding that the assemblies 50,52,54 are similarly constructed. The bracket assembly 48 includes a sleeve 56 slidably received on the post 34 of the frame 12. The sleeve 56 is generally C-shaped in cross section to define an open side configured to clear the rungs 46 as the sleeve slides relative to the frame 12. The sleeve 56 includes a plurality of apertures formed on the inside surface that are complementally spaced to match the spacing of the apertures 38 formed in the post 34 (not shown on the assembly 48, but see the bracket assembly 50). In this manner, the sleeve apertures are operable to axially align with the post apertures 38. In this regard, the bracket assembly 48 further includes a G-shaped pin 58 that is slidably received in the axially aligned apertures to retain the beam 16 and thus the platform 20 in a selected vertical position relative to the frame 12. The G-shaped pin 58 preferably slides in a pin guide 60 and is biased into the aligned holes by a spring (not shown). Although not shown, the bracket assembly 48 preferably includes an additional locking pin slidably received in a second set of axially aligned apertures to lock the beam 16 and thus the platform 20 in the selected vertical position. It is within the ambit of the present invention to utilize various alternative locking mechanisms and exemplary pin-type mechanisms are disclosed in the Wyse '003 patent previously incorporated herein.

The sleeve 56 is fixed to the beam 16 by a block 56*a* and by a gusset 56*b*. In this manner, the beam 16, and thus the work surface 20 supported thereon, slides with the sleeve 56 relative to the frame 12. The block 56*a* is open on its upper end and includes means for securing attachment components in the block 56*a* (e.g., the illustrated block 56*a* is configured to receive a guard rail (not shown) and includes a pin-receiving aperture to removably secure the guard rail in the block 56*a*). The gusset 56*b* provides additional support to the beam 16 relative to the sleeve 56.

One exemplary platform is disclosed in the previously incorporated Wyse '003 patent. However, the platform could be variously constructed and configured, for example, the platform need not be adjustable, and could be fixedly supported along the frames, or on top of the frames. Additionally, as indicated above, the scaffolding could alternatively be some other form of support structure, such as a wheeled cart, or a mobile ladder, or the like. However, it is important that the support structure is mobile, for example including wheels that rollably support the structure on the ground.

Figures 3, 9:
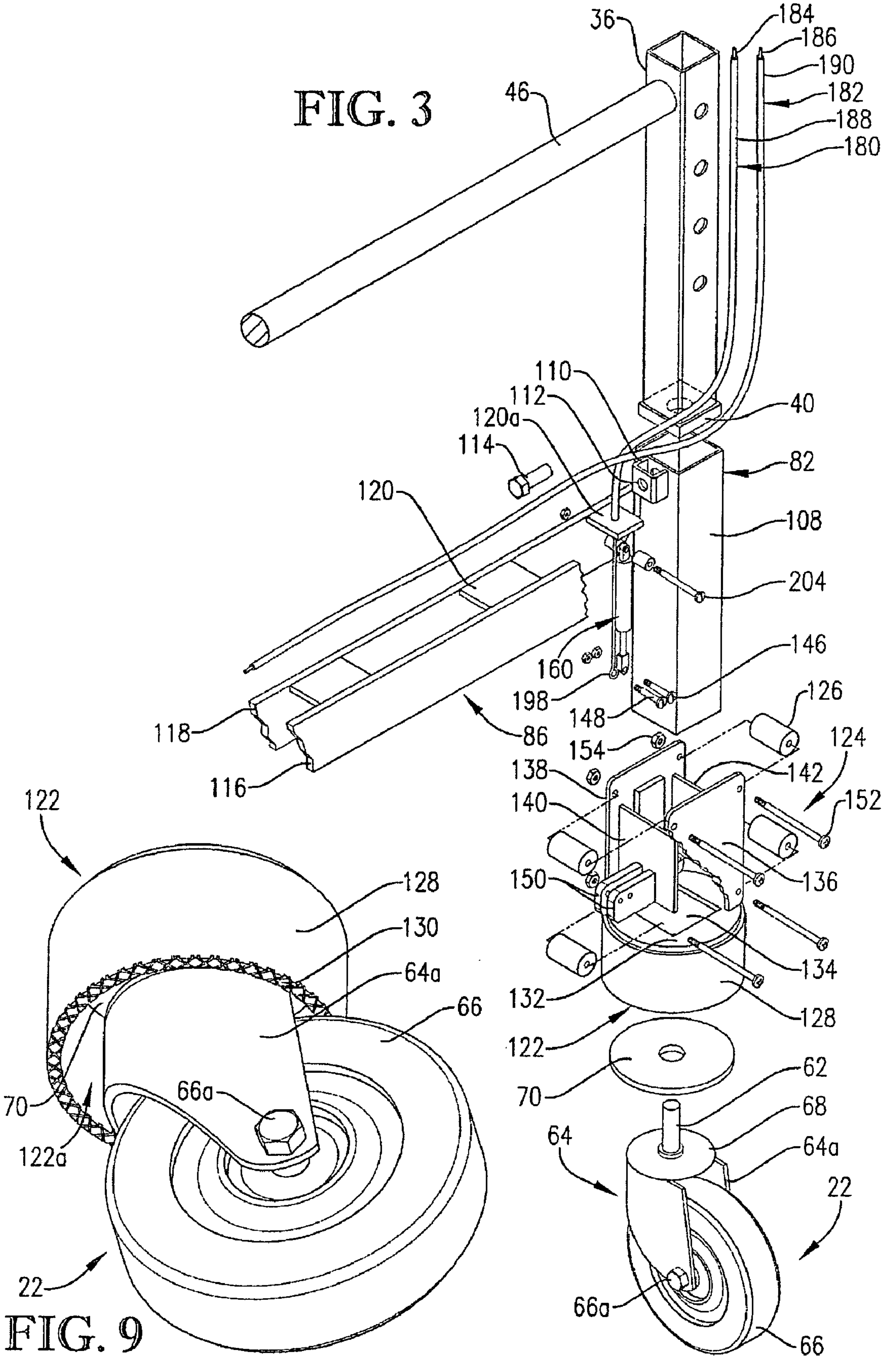
FIG. 3 is an enlarged fragmentary exploded view of the scaffolding illustrated in FIGS. 1–2 showing the assembly of the brake stop subassembly and caster illustrated in FIG. 2.
FIG. 9 is an enlarged perspective view of the scaffolding illustrated in FIGS. 1–8 with parts removed particularly showing the knurled wheel-engaging surface of the brake stop.
Figure 6:
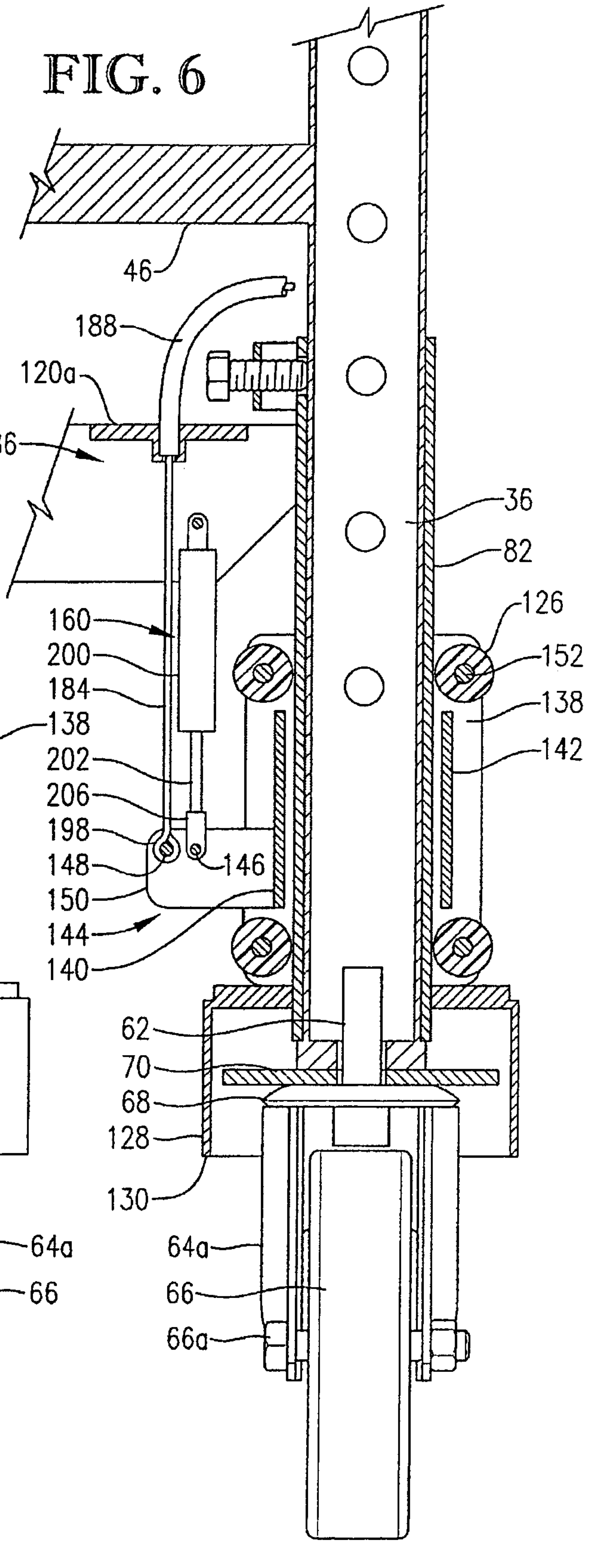
FIG. 6 is an enlarged fragmentary sectional view of the scaffolding illustrated in FIGS. 1–5 showing the brake assembly illustrated in FIGS. 2–5 with the brake stop subassembly shown in the braking position and the caster shown in elevation.
Figure 8:
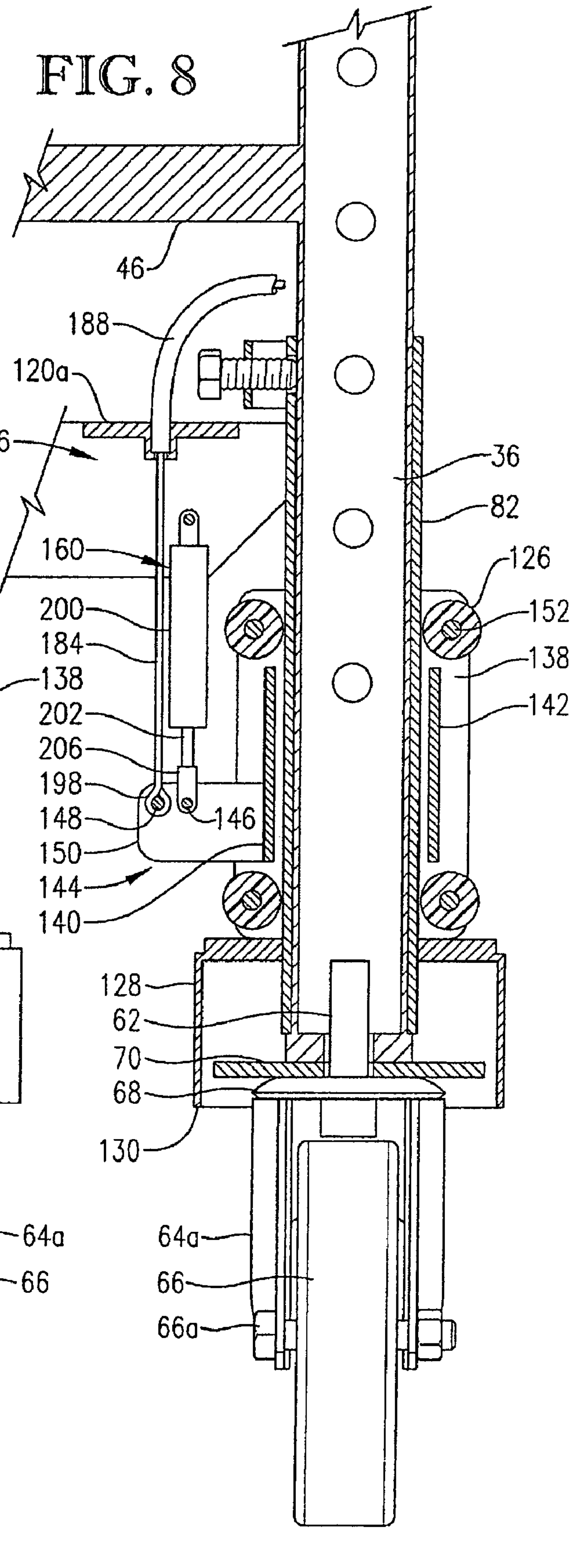
FIG. 8 is an enlarged fragmentary sectional view of the scaffolding similar to FIG. 6 illustrating the brake stop subassembly in the release position.

In the illustrated scaffold 10, mobility is provided by the casters 22,24,26,28. The casters 22,24,26,28 are received at the lower ends of the frames 12,14 to provide rolling engagement with the ground. Each of the casters 22,24,26, 28 are virtually identically configured, therefore, only the caster 22 will be further described in detail with the understanding that the casters 24,26,28 are similarly constructed. As illustrated in FIGS. 3, 6 and 8, the caster 22 broadly includes, an upright stub shaft 62 as part of a caster housing 64, and a wheel 66 rotatably coupled to the housing 64 about a central wheel axis. More particularly, the lower end cap 40 defines a central hole that snugly receives the shaft 62, so that the caster 22 is removably coupled to the post 34 (see FIGS. 6 and 8). However, the shaft 62 could be more permanently fixed to the post 34, such as by welding or the like. The preferred stub shaft 62 presents a cylindrical body defining an upright longitudinal axis. In addition to the stub shaft 62, the caster housing 64 further includes a lower portion 64*a* that is rotatably coupled to the shaft 62 about the upright axis. More preferably, and in one manner well known in the art, a bearing assembly 68 is provided at the lower end of the shaft 62, which enables the lower portion 64*a* of the housing 64 to rotate—or swivel—about the upright axis. That is to say, the bearing assembly 68 enables the caster housing portion 64*a* and wheel 66 to swivel in clockwise and counter clockwise directions with respect to the shaft 62. Finally, a top plate 70 is interposed between the lower end cap 40 and the bearing assembly 68, so that the scaffold load is evenly transferred to the caster housing 64 and wheel 66.

The wheel 66 is a conventional caster wheel as is known in the art and is commercially available from a variety of OEMs. The illustrated wheel 66 rollingly rotates about a bolt shaft 66*a* coupled to the lower housing 64*a*. It will be appreciated that the shaft 66*a* defines the central wheel axis. In this regard, the wheel 66 both rolls relative to the ground about the central wheel axis, as well as swivels with the lower housing 64*a* about the upright stub axis 62. The wheel 66 is well suited for use with mobile scaffolding, however, the wheel width, diameter and configuration could vary based upon the anticipated use of the scaffold 10, and could include for example a roller ball type configuration or the like.

The illustrated mobile scaffolding 10 can be selectively prevented from moving relative to the ground by the brake assemblies 30,32 associated with the corresponding pairs of casters 22,24 and 26,28, respectively. As further detailed below, the improved and unique brake assemblies 30,32 are configured to prevent the rotation of the wheels, such as the wheel 66, about the central wheel and upright axes and further configured to be activated by the worker while elevated on the scaffold 10. Each of the brake assemblies 30,32 are virtually identically configured and therefore only the brake assembly 30 will be described in detail with the understanding that brake assembly 32 is similarly constructed. As shown in FIG. 1, the illustrated brake assembly 30 broadly includes a brake housing 72 that is adjustably connected to frame 12, two shiftable brake stop subassemblies 74,76 and an actuator 78 adjustably connected to the housing 72 and configured to shift the brake stop subassemblies 74,76. However, it is within the ambit of the present invention for the brake assembly to include more or less than two brake stop subassemblies that are shiftably controlled by the actuator, where engagement with more or less than two casters is desired.

Figure 4:
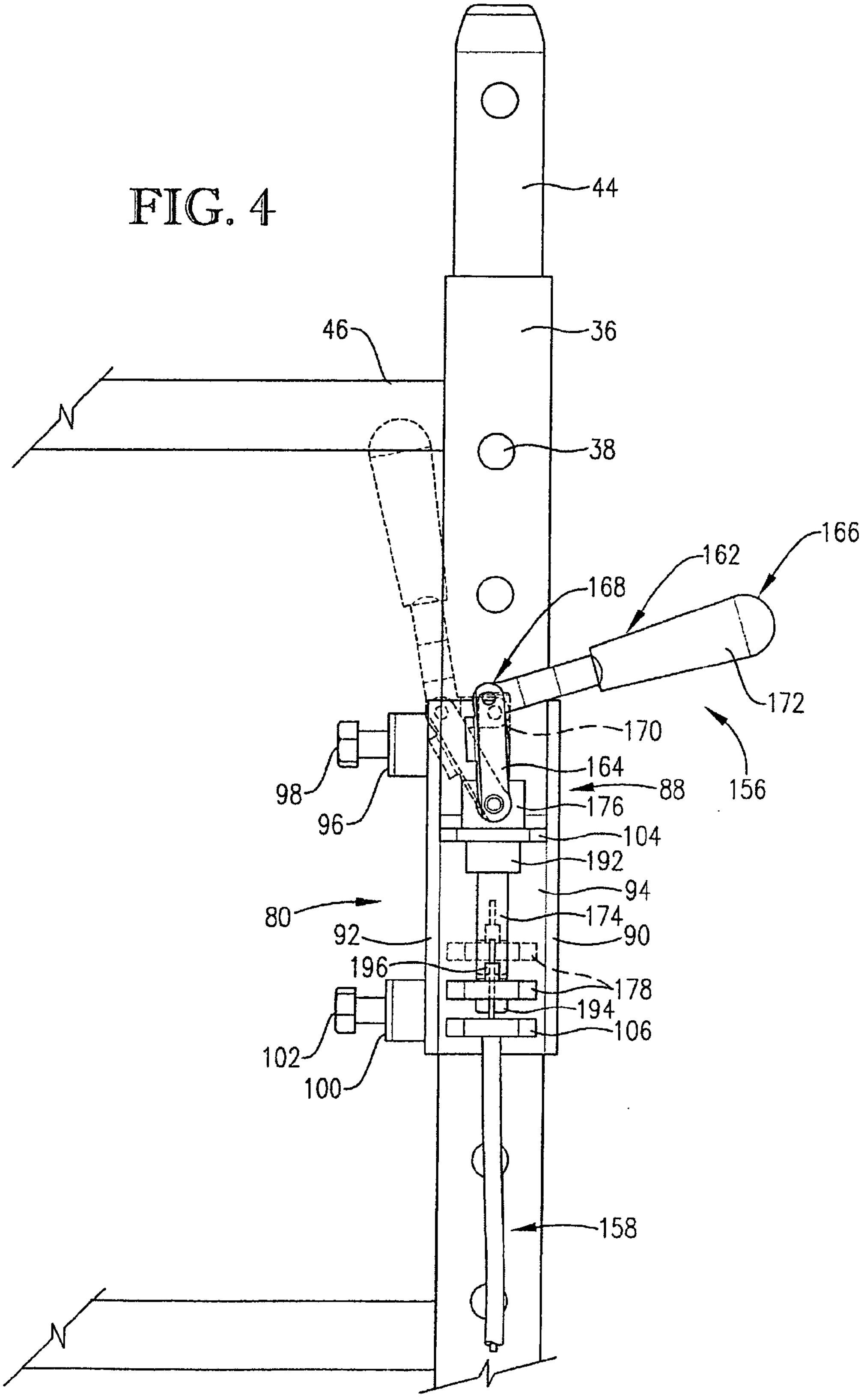
FIG. 4 is an enlarged fragmentary side elevational view of the scaffolding illustrated in FIGS. 1–3 showing the handle subassembly of one of the brake assemblies in the braking position (in solid lines) and in the release position (in phantom)

More particularly, the illustrated brake housing 72 includes an upper support member 80, two lower support members 82,84 respectively associated with brake stop subassemblies 74,76, and transverse bars 86 interconnecting the lower support members 82,84. As best shown in FIG. 4, the preferred upper support member 80 includes a U-shaped sleeve 88 that is telescopingly interfitted with post 36. The U-shaped sleeve 88 includes two oppositely facing side panels 90,92 and an intermediate panel 94 interconnecting the side panels 90,92. The side panels 90,92 are horizontally spaced so as to snugly receive the post 36. The upper support member 80 includes a first internally threaded boss 96 affixed to one of the oppositely facing panels 90,92. The boss 96 is coaxially aligned with an orifice (not shown) defined by the attached panel 92. The boss 96 and orifice are configured to receive an externally threaded lock bolt 98 that is axially longer than the length of the boss 96, so that the bolt 98 progressively engages the post 36 as it is threadably inserted into the boss 96. In this manner, the bolt 98 and boss 96 cooperate to adjustably and removably secure the upper portion of the brake housing 80 to the post 36. More preferably, the sleeve 88 also includes a second threaded boss 100 that is configured to receive a second lock bolt 102, as shown in FIG. 4. However, the upper housing 80 could be more permanently affixed to the frame 12 in any suitable manner. Finally, the upper housing 80 also includes two vertically spaced upper support prongs 104,106. The prongs 104,106 each define central openings (not shown) that are configured to receive portions of the actuator 78 as will be subsequently described herein. The prongs 104,106 are preferably fixed to the housing sleeve 88 along the intermediate panel 94, and the sleeve 88 is oriented, such that panel 94 and prongs 104,106 are opposite the platform side of the post 36. It is appreciated that this configuration facilitates the operation of the brake assembly 30, and reduces the likelihood of accidental disengagement by the elevated worker.

The lower support members 82,84 and the brake stop subassemblies 74,76 are virtually identically configured and therefore only lower support member 82 and brake stop subassembly 74 will be described in detail, with the understanding that lower support member 84 and brake stop subassembly 76 are similarly constructed. As perhaps best shown in FIGS. 2 and 3, the preferred lower support member 82 includes a tubular sleeve 108 that is telescopingly interfitted with post 36 adjacent the lower end. The illustrated sleeve 108 extends generally parallel to the post 36 of the frame 12 and is open along its entire axial length and at both its upper and lower ends. The lower support member 82 includes a locking clip 110 that defines a lower support hole 112. The lower support hole 112 is coaxially aligned with a hole (not shown) defined by the sleeve 108. The holes are configured to threadably receive a locking bolt 114, so that the bolt 114 progressively engages the post 36 to thereby securely couple the lower support 82, and thus the brake stop subassembly 74, to the post 36.

The brake housing 72 further includes a transverse bar 86 fixed to the lower support members 82,84 near their upper ends and extending generally orthogonally therebetween. The preferred bar 86 includes two longitudinal plates 116, 118 and a plurality of cross-members 120 that interconnect the two plates 116,118. The proximal most cross-members 120*a*,120*b* to the brake stop subassemblies 74,76, each define a wire receiving opening for purposes that will be subsequently described herein. Finally, the preferred brake housing 72 is removably coupled to the frame 12, so that the brake assembly 30 can be easily added on, or coupled to existing scaffolding of various configurations. However, it is within the ambit of the present invention to utilize alternative configurations for the brake housing 72. For example, the housing 72 could be integrally formed with the scaffolding frame during the original manufacture thereof.

Figure 5:
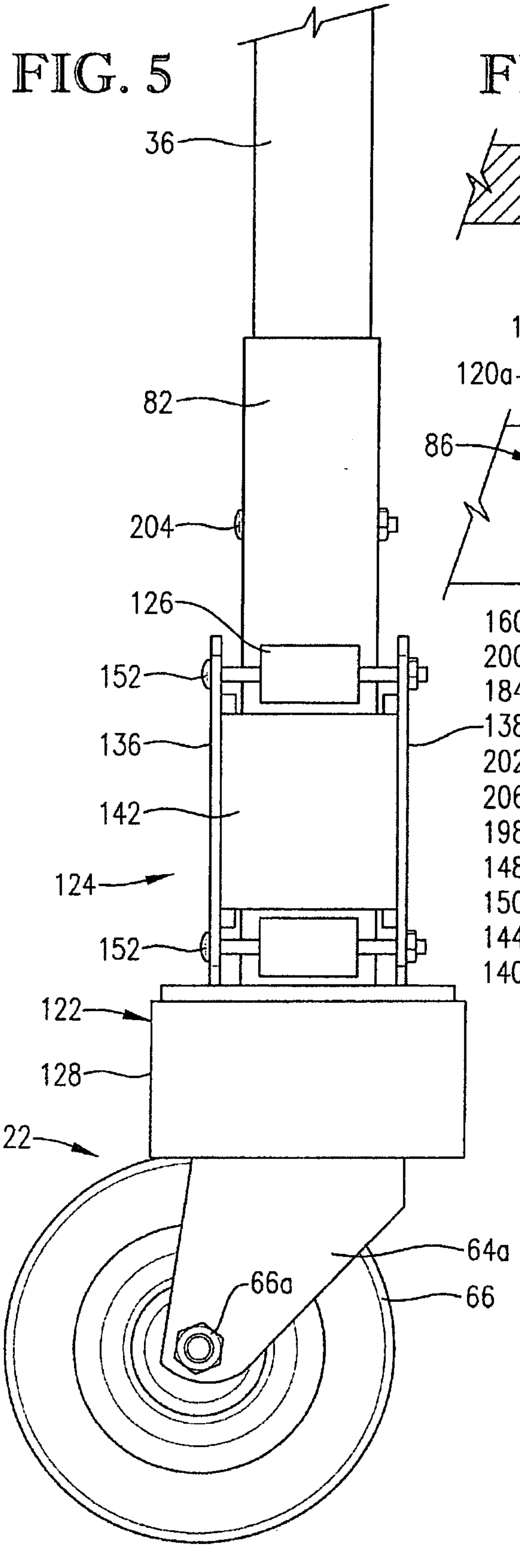
FIG. 5 is an enlarged fragmentary side elevational view of the scaffolding illustrated in FIGS. 1–4 showing the brake assembly illustrated in FIGS. 2–4 with the brake stop subassembly shown in the braking position.
Figure 7:
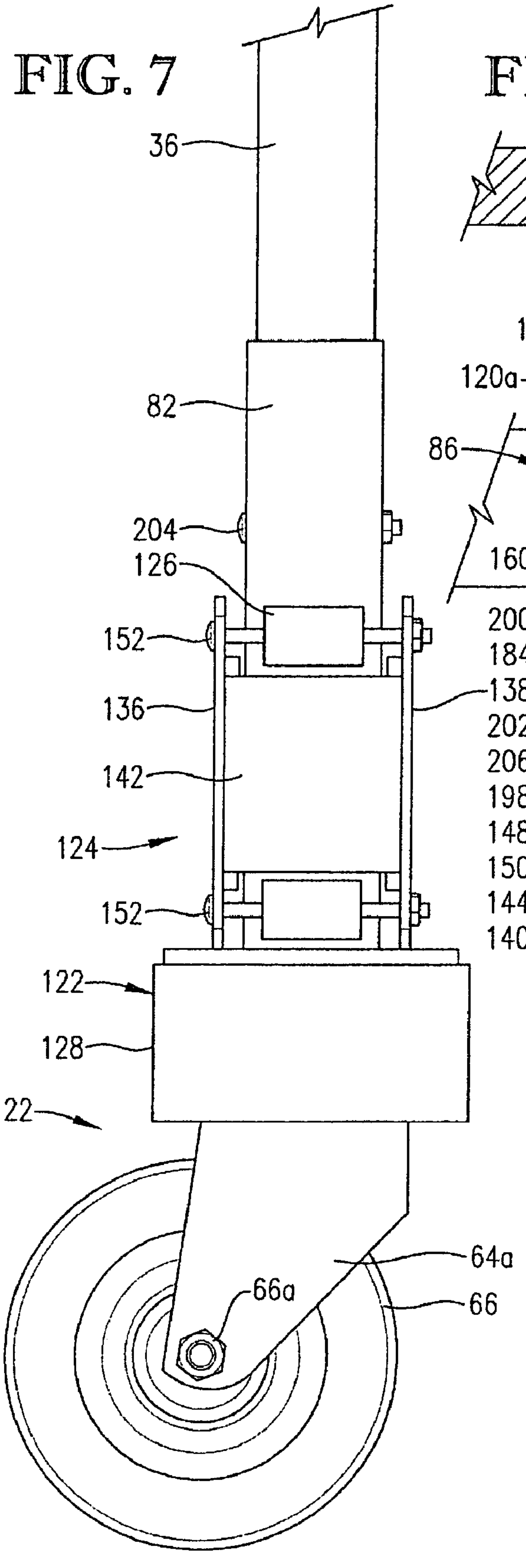
FIG. 7 is an enlarged side elevational fragmentary view of the scaffolding similar to FIG. 5 illustrating the brake stop subassembly in the release position.

As shown in FIGS. 5,6 and 7,8, the brake stop subassembly 74 is shiftably coupled to the lower support member 82 and is shiftable between a braking position as shown in FIGS. 5 and 6, wherein the wheel 66 of the caster 22 is generally prevented from rotating and swiveling, and a release position as shown in FIGS. 7 and 8, wherein the wheel 66 is free to rotate and swivel. The brake stop subassembly 74 broadly includes a cylindrical collar 122, a sleeve 124, and a plurality of rollers 126.

The preferred cylindrical collar 122 presents an endless wall 128 having a lower wheel engaging surface 130 and defining an inside diameter and a height (see FIG. 9). The wall 128 defines an open inner chamber 122*a* that is dimensioned and configured to non-engagingly receive the top plate 70, and a portion of the caster housing 64, when the brake stop subassembly 74 is in the braking position (see FIGS. 6 and 9). More specifically, the collar 122 is configured so that the lower engaging surface 130 bears against the wheel 66 in the braking position, while the brake stop subassembly 74 is spaced from the caster housing 64. The preferred lower engaging surface 130 is textured, i.e. knurled, serrated, etc., to increase the frictional engagement between the lower engaging surface 130 and the wheel 66. Finally, the collar 122 presents an upper surface 132 that defines a lower support receiving opening 134 (see FIG. 3). The lower support receiving opening 134 is configured to snugly receive the lower support member 82, so that the collar 122 is telescopingly shiftable relative thereto. In this regard, when the brake stop subassembly 74 is in the braking position, the surface 130 securely engages the wheel 66 and is anchored to the member 82 so as to prevent both rolling rotation of the wheel 66 as well as swiveling rotation of the wheel 66 relative to the member 82. In this manner, virtually all movement of the wheel 66 is prevented when the brake stop subassembly 74 is in the braking position and therefore the scaffold 10 is not subject to undesirable shifting, such as when a third party inadvertently bumps into the scaffold 10, as was problematic with the prior art caster brakes.

As shown in FIGS. 5-8, the preferred composite sleeve 124 is fixedly attached to the collar 122, so that the collar 122 and sleeve 124 unitarily translate. The sleeve 124 includes oppositely spaced plates 136,138 that directly engage the collar 122. The plates 136,138 are preferably permanently affixed to the collar 122 by means commonly known in the art such as welding, soldering or the like. A pair of horizontally spaced intermediate plates 140,142 interconnect the contact plates 136,138, and are similarly permanently affixed thereto. The upper and lower edges of the intermediate plates 140,142 are spaced from the upper and lower edges of the contact plates 136,138, and more preferably, the intermediate plates are vertically centered, so as to present congruent upper and lower roller-receiving sleeve gaps. The lateral edges of the intermediate plates 140,142 are spaced from the lateral edges of the contact plates 136,138, so that the intermediate and contact plates 136–142 define a central opening that is configured to receive the lower support member 82.

For reasons subsequently described herein, one of the intermediate plates 136,138 also includes an actuator engaging member 144. More preferably, the member 144 is mounted on the interior frame plate 140, as shown in FIGS. 6 and 8. The preferred member 144 includes a receiving pin, such as fastener 146, and a first cable-receiving pin, such as fastener148. The fasteners 146,148 are insertably received between two flat prongs 150. The prongs 150 are permanently affixed to the plate 140 by means commonly known in the art, such as welding, soldering or the like. The pins 146,148 are removably coupled to the prongs 150, so that the actuator 78 is detachable from the brake stop subassembly 74. It will be appreciated that the ability to readily disassemble the brake assembly 30 facilitates both a cost-efficient repair and replacement of defective component parts, as well as enables the brake assembly 30 to be easily and readily retrofit onto existing scaffolding.

The plurality of rollers 126, shown as four in the illustrated embodiment, is provided to present rolling engagement between the lower support member 82 and the brake stop subassembly 74. The rollers 126 are rotatably coupled to the sleeve 124 via roller pins 152 and nuts 154. The illustrated rollers 126 are removably coupled the sleeve 124. The rollers 126 are fastened near the upper and lower edges of the contact plates 126,128 and are vertically centered within the sleeve gaps. Finally, as shown in FIGS. 6 and 8, each pair of rollers 126 are horizontally spaced apart a distance equal to the width of the lower support member 82, so that each roller engages the member 82. In this manner, the rollers 126 reduce operational friction, and thereby, facilitate the shifting of the brake stop subassembly 74 into and out of the braking position.

Turning to the actuation of the illustrated brake assembly 30, and perhaps as best shown in FIGS. 4–6, the actuator 78 broadly includes a handle subassembly 156, a connection subassembly 158, and a biasing element 160. As shown in FIG. 4, the preferred handle subassembly 156 includes a pivotal L-shaped lever 162, and a guide bracket 164 pivotally coupled to the lever 162. The handle assembly 156 is pivotally coupled to the upper support member 80 and connected to the connection subassembly 158. More particularly, the pivotal lever 162 presents an L-shaped rod having a free distal end 166, an elbow 168 and a proximal end 170. The lever 162 includes a grip 172 that adhesively wraps a portion of the rod adjacent the distal end 166. The grip 172 is preferably formed from a soft material, such as rubber, that is configured for grasping by the worker. The proximal end 170 is pivotally coupled to a plunger 174 which forms the top portion of the connection subassembly 158. The guide bracket 164 is pivotally coupled to the elbow 168 at one end and fixed to a bushing block 176 at the opposite end.

The lever 162 is pivotal from the release position, as shown in phantom in FIG. 4, wherein the grip 172 is oriented toward the rungs 46 of the frame 12 and somewhat parallel to post 36 of the frame 12, to the braking position, as shown in solid line in FIG. 4, wherein the grip 172 is oriented away from the post 36 and somewhat parallel with the rungs 42. When the lever 162 is in the release position shown in FIG. 4, the top of the plunger 174 is spaced from the bushing block 176. This position corresponds to the brake stop subassembly 74 also being in the release position as shown in FIGS. 7 and 8. As the lever 162 is pivoted toward the braking position shown in FIG. 4, the top of the plunger 174 is caused to downwardly slide towards the bushing block 176. As the proximal end 170 pivots relative to the plunger 174, the elbow 168 pivots relative to the guide bracket 164. In this manner, the handle subassembly 156 transfers only straight-line motion to the plunger 174. When the lever 162 is in the braking position, as shown in solid lines in FIG. 4, this corresponds with the brake stop subassembly 74 also being in the braking position as shown in FIGS. 5 and 6. The weight of the connection subassembly 158 and the configuration of the handle subassembly 156 cooperate to maintain the lever 162 in the braking position. In order to pivot the lever 162 back into the release position to release the brake, the weight of the connection subassembly 158 must be overcome until the lever 162 pivots past a center position (not shown). Once the lever 162 pivots past the center position, the weight of the connection assembly urges the handle subassembly 156 back into the release position shown in FIG. 4. In this regard, the illustrated handle subassembly 156 is a straight-line over-the-center-type clamp. One such suitable clamp is available from DE-STA-CO Industries of Madison Heights, Mich. as Model No. 604.

In addition to the plunger 174, the illustrated connection subassembly 158 includes a floater prong 178 connected to the plunger 174 adjacent the lower end, and first and second cables 180,182 adjustably fastened to the floater prong 178 (see FIGS. 3 and 4). The first and second cables include radially inner wires 184,186 and outersheaths 188,190. As shown in FIG. 1, the second cable 182 preferably extends along the post 36 and transverse bar 86, and, therefore, presents a longer length than does the first cable 180.

The bushing block 176 is fastened against the upper surface of the uppermost support prong 104 by a bushing block nut 192 that bears against the lower surface of prong 104. The bushing block 174, uppermost prong 104, and bushing block nut 192 define coaxially aligned central openings that snugly receive the plunger 174. The floater prong 178 also defines a central opening, and is fixedly connected to the plunger 174 by an externally threaded bolt 194 that extends through the floater prong opening and is threadably received within a tapped axial hole (not shown) defined by the lower end of the plunger 174.

As shown in FIG. 4, the floater prong 178 is fastened to the first and second cable wires 184,186 near the upper ends of the wires 184,186. More particularly, the floater prong 178 defines a pair of symmetrically spaced wire receiving openings (not shown) configured to receive the first and second cable wires 184,186 respectively. Portions of the wires 184,186 are inserted through the respective floater prong openings. Finally, a pair of cable clamps 196 are coaxially aligned with the openings and fastenably engaged to the portions of the wires 184,186 inserted through the prong openings.

The lowermost upper support prong 106 also defines a pair of wire receiving openings that are configured to initially receive the portions of the first and second cables wires 184,186, but not the first and second cable sheaths 188,190. The lowermost prong 106 stops the sheaths 188, 190 when the cables 180,182 are drawn upwardly towards their braking position, so that the wires 184,186 are able to slidably translate therein. It is appreciated that this configuration reduces the weight of operation and facilitates the actuation of the braking assembly 30. Alternatively, lubricant (i.e, light grease, heavy oil, plastic lining, etc.) can be interposed between the wires 184,186 and sheaths 188,190 so as to reduce static and kinetic friction therebetween.

The actuator 78 includes virtually identical means for interconnecting to and biasing brake stop subassemblies 74,76. As such, only the interconnection of the first cable 180 to brake stop subassembly 74 and the first biasing element 160 will be further described herein, with the understanding that the interconnection of the second cable 182 to brake stop subassembly 76 and the second biasing element (not shown) are similar. As shown in FIGS. 3, 6, and 8, the lower end of the wire 184 is passed through the wire receiving opening (not shown) defined by the proximal most cross-member 120*a* to the brake assembly 74. The opening is configured to receive the first cable wire 184, but not the first cable sheath 188, so that the sheath 188 is stopped and the wire184 is allowed to translate therein, when the first cable 180 is downwardly drawn towards its braking position. At the lower end of wire 184 is presented a rigid loop 198 that is removably coupled to the actuator engaging member 144 by the first cable-receiving pin 148. Thus, the brake stop subassembly 74 is connected to the handle subassembly 156.

The preferred brake stop subassembly 74 is biased towards the braking position by the biasing element 160. The biasing element 160 is oriented such that the direction of the biasing vector is parallel to the linear motion of the shiftable collar 122. In this arrangement, the magnitude of the biasing vector must additionally be overcome, when shifting the brake stop subassembly 74 from the braking position shown in FIGS. 5 and 6, to the release position shown in FIGS. 7 and 8. In the illustrated embodiment, the biasing element 160 includes a single acting pneumatic cylinder 200 filled with pressurized gas (not shown), and a translatable piston rod 202 sealably interconnected with the cylinder 200. However, it is within the ambit of the present invention to provide alternative biasing means, such as a spring or hydraulic cylinder.

The upper end of the pneumatic cylinder 200 is removably connected to the transverse bar 86 by a pin fastener 204 (see FIG. 3). A clevis 206 fixed to the lower end of the piston rod 202 is removably coupled to the actuator engaging member 144 by the receiving pin fastener 146. It will be appreciated by those ordinarily skilled in the art that the pressurized gas generates a biasing force that is proportional to the compression thereof, so that the magnitude of the biasing vector increases as the translatable piston rod 202 is drawn into the cylinder 200.

As previously indicated, the configuration of the brake assembly 32 is virtually identical that of the brake assembly 30 described in detail above. Although the dual brake assemblies 30,32 are preferred to provide a brake stop for each of the casters 22–28, the scaffolding 10 could include a single brake assembly (with stops on only two caster wheels) or a single stop on any one of the caster wheels. Additionally, it is within the ambit of the present invention to utilize various alternative configurations for the brake assemblies 30,32. Although preferred, the brake assemblies do not need to enable activation by the worker while elevated on the platform 20, and if a top-activated brake assembly is utilized, it could incorporate various alternative linkages to activate the brake stop below. Furthermore, if one activator is used for a pair of brake stops, the brake stops could be linked in a variety of alternative ways. The brake stop(s) could be variously configured as well and, for example, need not include the cylindrical collar spaced from the caster housing. However, it is important that the brake stop(s) is configured to generally prevent both rolling and swiveling rotation of the caster wheel.

In operation, once the mobile scaffold 10 is erected as described above, the upper support member 80 can be vertically adjusted by disengaging the lock bolts 98,102 from the post 36. The upper support member 80 is vertically spaced between the platform 20 and upper end of the scaffold 10, so as to enable the worker supported on the scaffolding 10 to shift the brake stop subassemblies 74,76 into and out of the braking position. The worker selectively prevents the movement of the scaffold 10 by pivoting the lever 162 in the clockwise direction and shifting the brake stop subassemblies 74,76 until the braking position is achieved. To enable movement, the worker pivots the lever 162 in the counter-clockwise direction until the released position is achieved. The brake stop subassemblies 74,76 can be vertically adjusted by loosening the locking bolts 114, vertically adjusting the conjoined subassemblies 74,76, and reinserting the locking bolts 114 to engage the lower support members 82,84. Finally, to maintain proper function of the brake assembly 30, the actuator 78 can be adjusted by loosening the clamps 196, manually adjusting the cable wires 184,186, and refastening the clamps 196.

As indicated above, the brake assemblies could be alternatively configured. One such suitable alternative brake assembly configuration is shown in the mobile scaffolding 300 illustrated in FIGS. 10–14. The scaffolding 300 is similar in many respects to the scaffolding 10 described in detail above and therefore will only be described in detail with respect to the differences. In particular, the scaffolding 300 includes a brake assembly 302 that broadly includes an upper and a lower brake housing 304 and 306, respectively, a plunger 308, a handle subassembly 310, and a brake stop subassembly 312. The upper and lower brake housings 304,306 are similar to the brake housing 72 detailed above. However, for purposes that will subsequently become apparent, the lower housing 306 does not include any cross members between the transverse bars 314 and 316. Additionally, each of the bars 314,316 include access cutouts 314*a* and 316*a*, respectively, to facilitate access for installation and maintenance of the brake stop subassembly 312. The handle subassembly 310 is also similar to the handle subassembly 156 described in detail above. However, the handle subassembly 310 is configured for coupling to the plunger 308 rather than wires. The plunger 308 is configured to transfer movement of the over-the-center handle to the brake stop subassembly 312. One such suitable plunger configuration is disclosed in the '634 Application previously incorporated herein.

Figure 12:
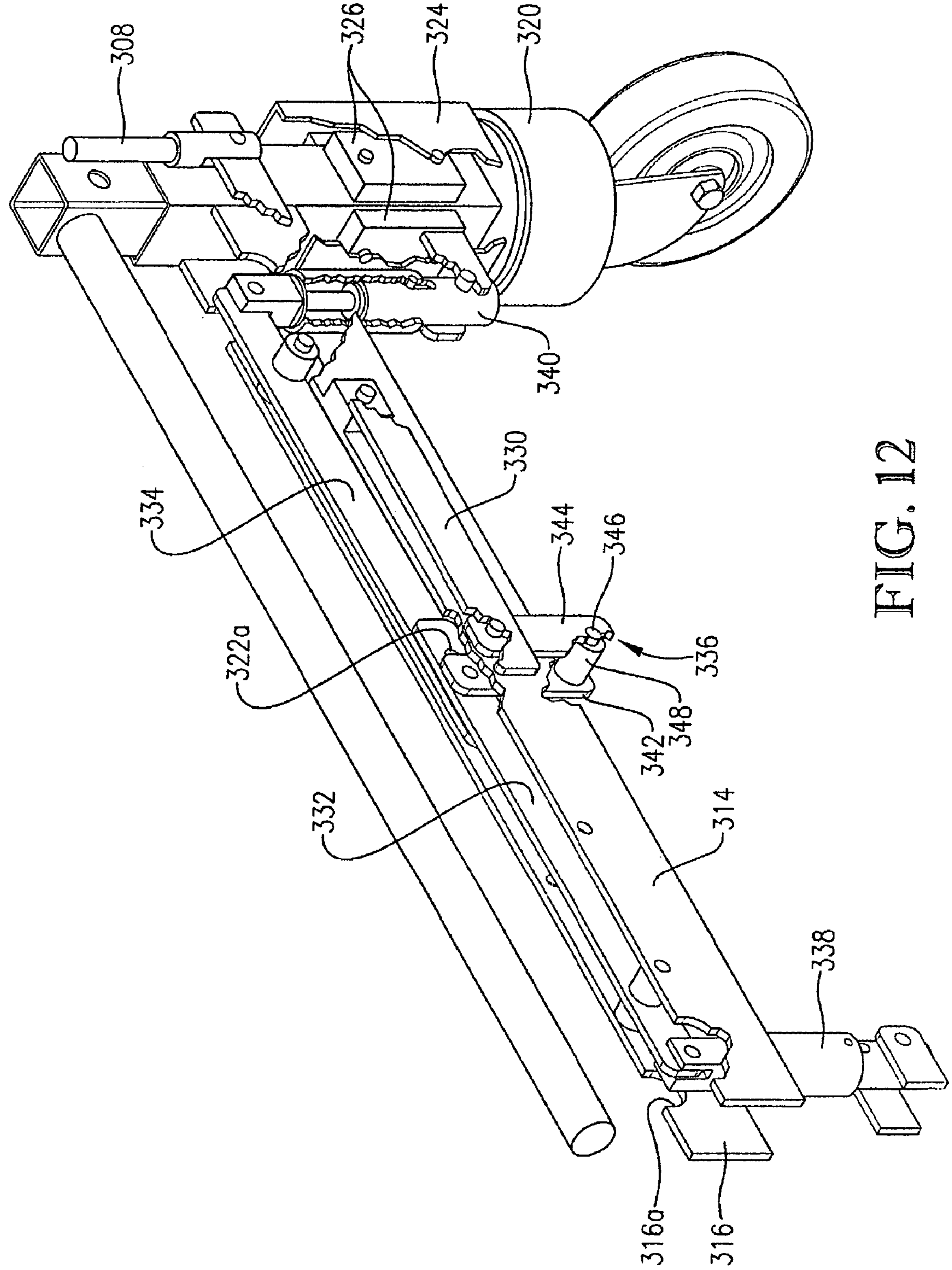
FIG. 12 is an enlarged perspective view of the scaffolding illustrated in FIGS. 10–11 with parts removed to show the components of a brake stop subassembly and the linkage between the two brake stop subassemblies.
Figure 13:
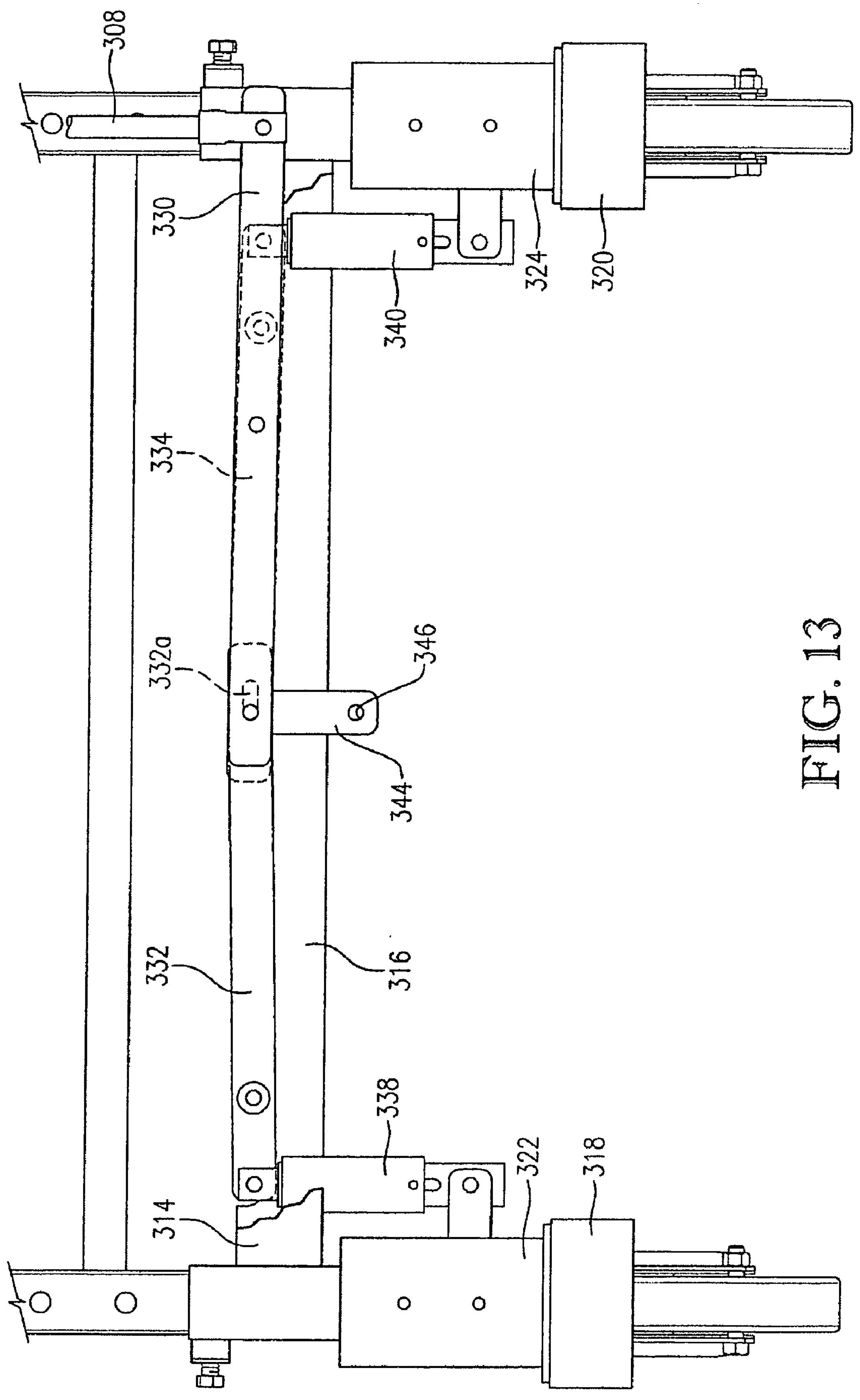
FIG. 13 is an enlarged fragmentary elevational view of the scaffolding illustrated in FIGS. 10–12 with parts removed and showing the brake assembly in the braking position.
Figure 14:
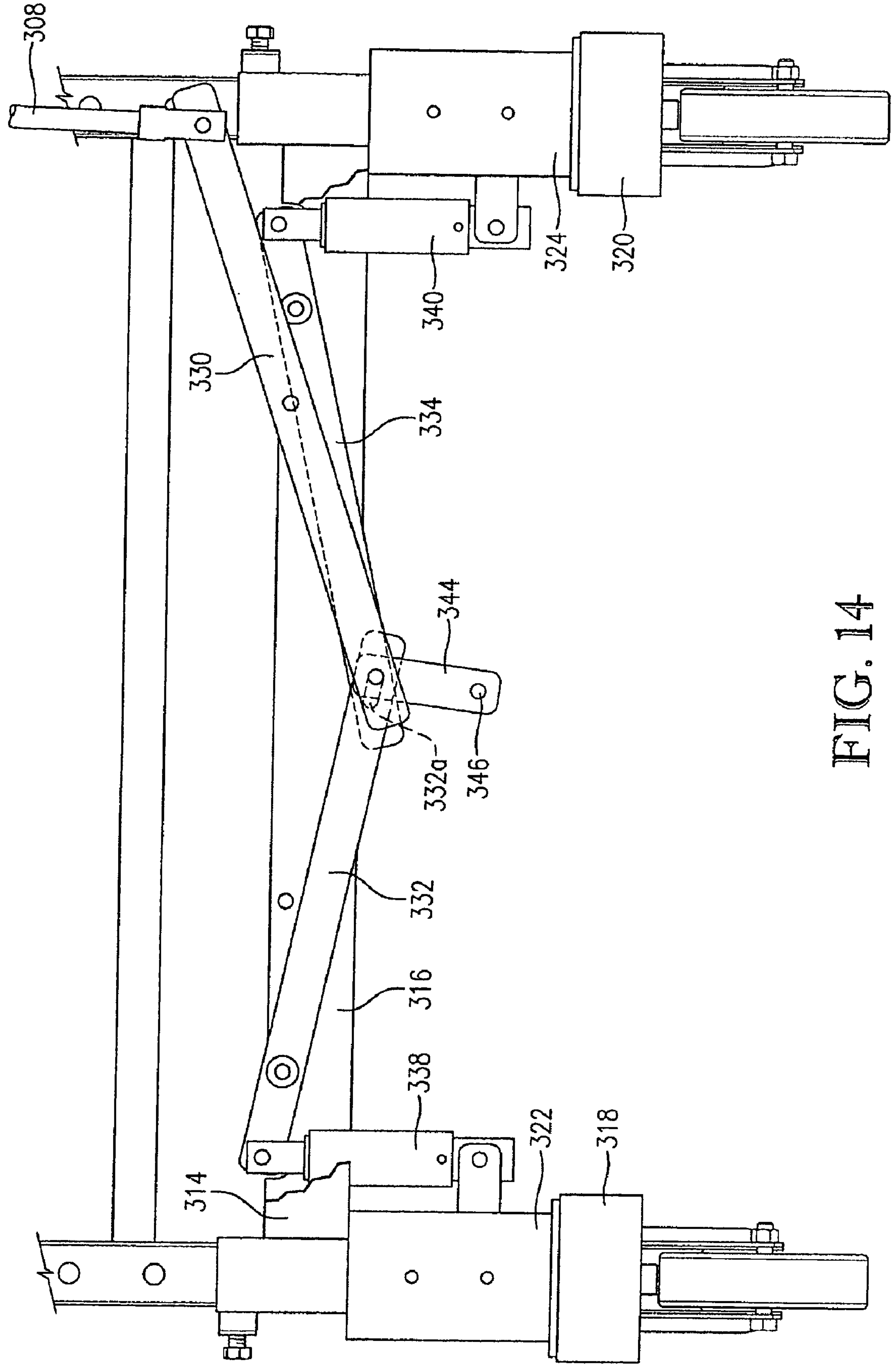
FIG. 14 is an enlarged perspective view of the scaffolding with parts removed similar to FIG. 13 showing the brake assembly in the release position.

As shown in FIGS. 13 and 14, the brake stop subassembly 312 is shiftably coupled to the lower housing 306 and is shiftable between a braking position as shown in FIG. 13, wherein the caster wheels are generally prevented from rotating and swiveling, and a release position as shown in FIG. 14, wherein the caster wheels are free to rotate and swivel. As shown in FIGS. 12–14, the brake stop subassembly 312 broadly includes a pair of cylindrical collars 318 and 320, a pair of sleeves 322 and 324, each associated with a corresponding collar 318 and 320, respectively, a plurality of spacers associated with each sleeve (with only the spacers 326 associated with the sleeve 324 being shown), and a linkage subassembly 328 linking the collars 318,320.

In more detail, the collars 318,320 are each virtually identical in configuration to the collar 122 described in detail above. Similarly, the sleeves 322,324 are each similar in configuration to the sleeve 124 detailed above. However, the sleeve 124 is configured for use with the rollers 126 whereas the sleeve 324 (as well as the sleeve 322) is associated with the spacers 326 to facilitate smooth shifting of the brake subassembly 312 into and out of the braking position. The spacers 326 are preferably formed of plastic or the like and are supported between the sleeve 324 and the corresponding sleeve of the lower housing 306 in any suitable manner, such as by rivets or the like.

As shown in FIGS. 12–14, the linkage subassembly 328 links the brake stop subassembly 312 to the plunger 308, as well as links the collar/sleeve 318,322 with the collar/sleeve 320,324 so that each move into and out of the braking position in unison. The illustrated linkage 328 includes a plunger bar 330, a distal bar 332, a proximate bar 334, a coupler bracket 336, and a pair of biasing elements 338 and 340. In more detail, one end of the plunger bar 330 is pivotally coupled to the bottom end of the plunger 308 and the other end is pivotally coupled to the coupler bracket 336. Between the ends, the plunger bar 330 is rotatably coupled to the transverse bar 314 (see FIGS. 10 and 12). In this manner, when the plunger 308 is raised, the distal end of the bar 330 coupled to the bracket 336 is caused to move downwardly as shown in FIG. 14. The distal bar 332 is pivotally coupled to the biasing element 338 at one end and to the bracket 336 at the other end. To facilitate smooth and easy movement of the distal bar 332 and as shown in FIGS. 13 and 14, the coupling bracket 336 is configured to slide relative to the bar 332, such as in the slot 332*a*. Between the ends, the distal bar 332 is rotatably coupled between the transverse bars 314,316. In this manner, when the distal end of the plunger bar 330 is pivoted downwardly, the distal bar 332 pivots causing the biasing element 338 to slide upwardly as shown in FIG. 14. In a similar manner, the proximate bar 334 is rotatably coupled between the transverse bars 314,316 and links the biasing element 340 and the coupler bracket 336 (and thus the plunger bar 330). The coupler bracket 336 couples the bars 330,332,334 together and includes a pair of vertical links 342 and 344 coupled together by a shaft 346. The shaft 346 includes a roller 348 that is configured to ride against the bottom of the transverse bar 314 when the subassembly 312 is in the braking position (see FIG. 10). Although the handle subassembly 310 cooperates with the plunger 308 (and the biasing elements 338,340) to generally retain the subassembly 312 in the braking position, the roller 348 adds further protection against over pivoting of the linkage subassembly 328 and thus ensures the subassembly 312 will not inadvertently shift out of the braking position.

Figures 10, 11:
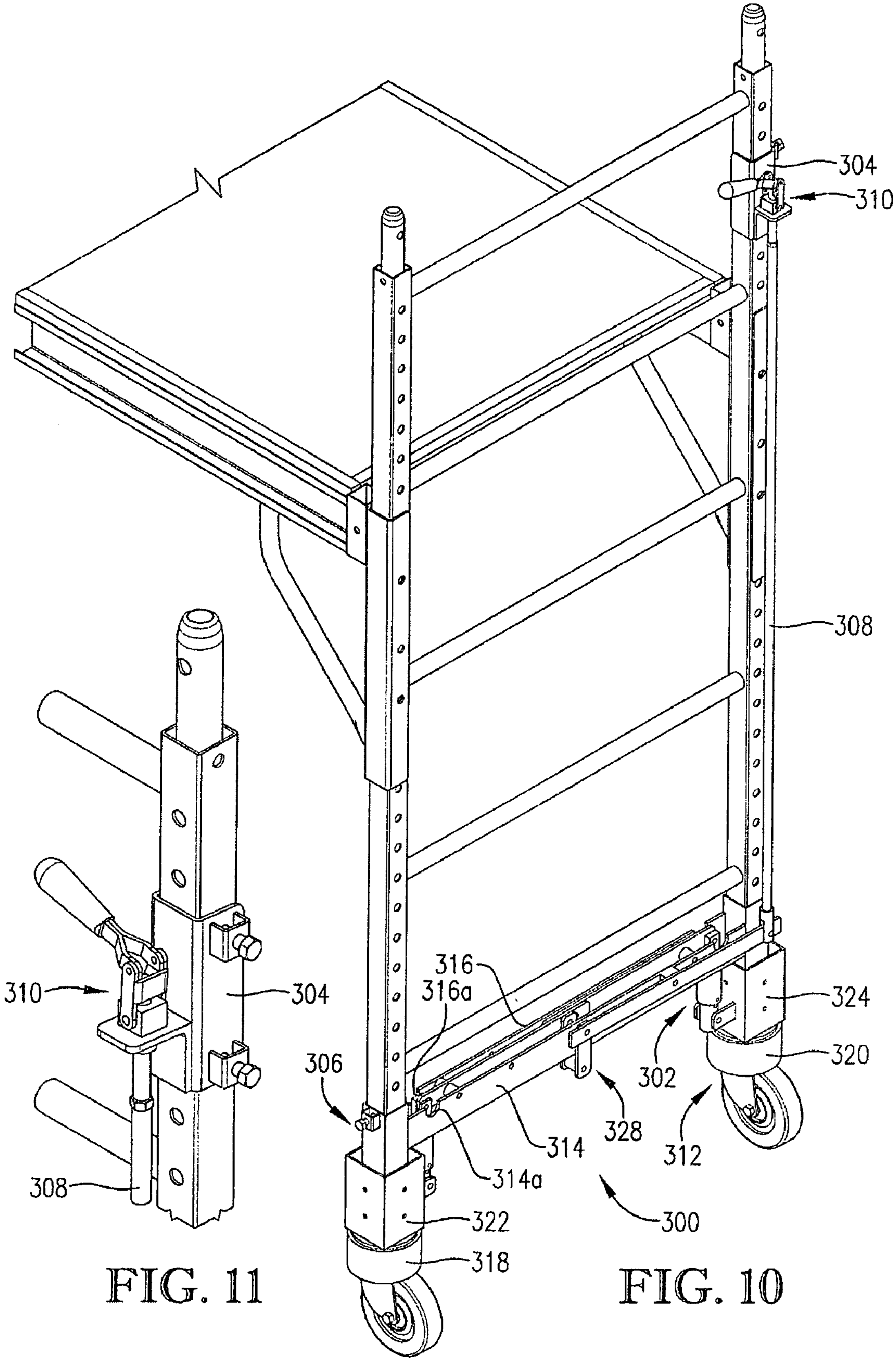
FIG. 10 is a fragmentary perspective view of a mobile scaffolding constructed in accordance with a preferred alternative embodiment of the present invention and showing an improved brake assembly associated with a pair of the casters.
FIG. 11 is an enlarged fragmentary perspective view of the scaffolding illustrated in FIG. 10 showing the portion of the plunger coupled to the handle subassembly and showing the handle subassembly in the braking position.

The biasing elements 338,340 are each similar to the biasing element 160 detailed above. However, the cylinders are coupled to the prongs of the corresponding sleeves 322,324, respectively, and the devises are coupled to the corresponding bars 332,334, respectively. When the handle subassembly 310 is placed in the braking position (as shown in FIGS. 10 and 11), the plunger 308 is in its lowermost orientation and thus the linkage bars 330,332,334 are all generally parallel to the transverse bars 314,316 corresponding to the brake stop subassembly 312 being in the braking position. When the handle subassembly 310 is shifted to the release position, the plunger 308 is shifted upward causing the plunger bar 330 to pivot pushing the coupler bracket 336 downward and thus shifting the bars 332,334 downward corresponding to the brake stop subassembly 312 being in the release position as shown in FIG. 14. The linkage subassembly 328 could be variously alternatively configured and need not, for example, include biasing elements.

As indicated above, the linkage subassembly could be variously configured. One such suitable alternative linkage configuration is shown in the mobile scaffolding 400 illustrated in FIGS. 15 and 16. The scaffolding 400 includes a brake assembly 402 that broadly includes an upper housing (not shown), a lower housing 404, a plunger 406, a handle subassembly (not shown), and a brake stop subassembly 408. The lower housing 404 differs from the previously described brake housings and includes two pair of vertical risers 410, 412 and 414, 416 that are each bolted onto a respective post of the frame of the scaffolding 400. The pairs of vertical risers 410,412 and 414,416 are coupled by a pair of transverse bars 418 and 420. The brake stop subassembly 408 broadly includes a pair of cylindrical collars 422 and 424, a pair of sleeves 426 and 428, each associated with a corresponding collar 422 and 424, respectively, a plurality of spacers associated with each sleeve (not shown), and a linkage subassembly 430 linking the collars 422,424 and sleeves 426,428.

The collars 422,424 are each virtually identical in configuration to the collar 120 described in detail above. Similarly, the sleeves 426,428 are each similar in configuration to the sleeves 322,324 detailed above. However, the sleeves 426,428 each include an inner linkage-receiving box 426*a* and 428*a*, respectively, in place of the biasing element-receiving prongs. The linkage subassembly 430 presents a simplified configuration relative to the linkage subassembly 328 detailed above and does not include any biasing elements. The linkage subassembly 430 includes a plunger bar 432 pivotally coupled to the bottom of the plunger 406 at one end and pivotally coupled to the box 426*a* at its other end. Between its ends, the plunger bar 432 is rotatably coupled between the transverse bars 418,420 by a bolt. One end of a linkage bar 434 is pivotally coupled between the ends of the plunger bar 432 and pivotally coupled to the other box 428*a* at its opposite end. Between its ends, the linkage bar 434 is rotatably coupled between the transverse bars 418,420 by a bolt. In this manner, the plunger 406 is pulled upwardly with the handle subassembly to place the brake assembly 402 in its braking position as shown in FIG. 15 and pushed downwardly to shift the brake assembly 402 to its release position as shown in FIG. 16.

The preferred forms of the invention and mode of operation described above are to be used as illustration only, and should not be utilized in a limiting sense in interpreting the scope of the present invention. Obvious modifications to the exemplary embodiments, as hereinabove set forth, could be readily made by those skilled in the art without departing from the spirit of the present invention.

The inventors hereby state their intent to rely on the Doctrine of Equivalents to determine and assess the reasonably fair scope of the present invention as pertains to any apparatus not materially departing from but outside the literal scope of the invention as set forth in the following claims.

The invention claimed is:

1. A mobile scaffold comprising:

a first frame vertically elongated between first and second ends;

a first caster including a first caster housing rotatably coupled to the frame adjacent the first end and a first wheel rotatably coupled to the caster housing; and a brake assembly connected to the frame and including a first shiftable brake stop, said stop being shiftable into and out of a braking position, wherein the stop engages the wheel, said brake assembly being spaced from the caster housing when the stop is in the braking position, said brake assembly further including a brake housing adjustably connected to the frame and shiftably coupled to the stop.

2. The mobile scaffold as claimed in claim 1, at least a portion of said brake housing being telescopingly interconnected with the frame.

3. The mobile scaffold as claimed in claim 1, said brake assembly further including an actuator in communication with the stop, said actuator being configured to cause the stop to shift into and out of the braking position.

4. The mobile scaffold as claimed in claim 3,
said actuator including a shiftable handle substantially spaced from the stop,
said brake housing including spaced upper and lower support members
said handle being shiftably coupled to the upper support member,
said stop being shiftably coupled to the lower support member.

5. The mobile scaffold as claimed in claim 4,
said upper and lower support members each being removably coupled to the frame,
said upper and lower support members each being independently adjustable such that the brake stop and handle are separately adjustable relative to the frame.

6. The mobile scaffold as claimed in claim 4,
said actuator further including a connection element interconnecting the handle and brake stop.

7. The mobile scaffold as claimed in claim 6,
said connection element including a first cable.

8. The mobile scaffold as claimed in claim 1,
said stop being biased into the braking position.

9. The mobile scaffold as claimed in claim 1; and
a second caster including a second caster housing rotatably coupled to the frame adjacent the lower end and a second wheel rotatably coupled to the second caster housing,
said brake assembly including a second shiftable brake stop,
said second stop being shiftable relative to the second caster into and out of a braking position, wherein the second stop engages the second wheel and the brake assembly is spaced from the second caster housing.

10. The mobile scaffold as claimed in claim 9,
said brake assembly including a handle, and first and second cables interconnecting the first and second stops to the handle.

11. The mobile scaffold as claimed in claim 1;
a second caster including a second caster housing rotatably coupled to the second frame adjacent the first end and a second wheel rotatably coupled to the second caster housing; and
a second brake assembly fixed to the frame, and including a second shiftable brake stop,
said second stop being shiftable into and out of a braking position, wherein the second stop engages the second wheel and the second brake assembly is spaced from the second caster housing.

12. A mobile scaffold comprising:
a first frame vertically elongated between first and second ends;
a first caster including a first caster housing rotatably coupled to the frame adjacent the first end and a first wheel rotatably coupled to the caster housing; and
a brake assembly connected to the frame and including a first shiftable brake stop,
said stop being shiftable into and out of a braking position, wherein the stop engages the wheel,
said brake assembly being spaced from the caster housing when the stop is in the braking position,
said brake assembly further including an actuator in communication with the stop,
said actuator being configured to cause the stop to shift into and out of the braking position,
said actuator including an L-shaped lever pivotally coupled relative to the stop and configured to shift the stop into and out of the braking position.

13. A mobile scaffold comprising:
a first frame vertically elongated between first and second ends;
a first caster including a first caster housing rotatably coupled to the frame adjacent the first end and a first wheel rotatably coupled to the caster housing; and
a brake assembly connected to the frame and including a first shiftable brake stop,
said stop being shiftable into and out of a braking position, wherein the stop engages the wheel,
said brake assembly being spaced from the caster housing when the stop is in the braking position,
said brake assembly further including a brake housing connected to the frame,
said brake assembly further including an actuator in communication with the stop,
said actuator being configured to cause the stop to shift into and out of the braking position,
said actuator including a shiftable handle substantially spaced from the stop,
said brake housing including spaced upper and lower support members,
said handle being shiftably coupled to the upper support member,
said stop being shiftably coupled to the lower support member,
said actuator further including a connection element interconnecting the handle and brake stop,
said connection element including a plunger.

14. A mobile scaffold comprising:
a first frame vertically elongated between first and second ends;
a first caster including a first caster housing rotatably coupled to the frame adjacent the first end and a first wheel rotatably coupled to the caster housing; and
a brake assembly connected to the frame and including a first shiftable brake stop,
said stop being shiftable into and out of a braking position, wherein the stop engages the wheel,
said brake assembly being spaced from the caster housing when the stop is in the braking position,
said stop including a sleeve telescopically intercoupled with the frame.

15. The mobile scaffold as claimed in claim 14,
said stop including a plurality of rollers configured to present a rolling engagement between the sleeve and frame.

16. A mobile scaffold comprising:
a first frame vertically elongated between first and second ends;
a first caster including a first caster housing rotatably coupled to the frame adjacent the first end and a first wheel rotatably coupled to the caster housing;
a brake assembly connected to the frame and including a first shiftable brake stop,
said stop being shiftable into and out of a braking position, wherein the stop engages the wheel,
said brake assembly being spaced from the caster housing when the stop is in the braking position; and
a second caster including a second caster housing rotatably coupled to the frame adjacent the lower end and a second wheel rotatably coupled to the second caster housing,
said brake assembly including a second shiftable brake stop,
said second stop being shiftable relative to the second caster into and out of a braking position, wherein the second stop engages the second wheel and the brake assembly is spaced from the second caster housing, said braking assembly including a handle, a linkage subassembly intercommunicating the first and second stops, and a plunger coupled between the handle and the linkage subassembly, said handle, linkage subassembly, and plunger cooperating to simultaneously shift the first and second stops into their respective braking positions.

17. The mobile scaffold as claimed in claim 16, said linkage subassembly including a first bar pivotally coupled to the plunger and a second bar pivotally coupled to the first bar and pivotally coupled to one of said first and second stops.

18. A mobile scaffold comprising:

a first frame vertically elongated between first and second ends;

a first caster including a first caster housing rotatably coupled to the frame adjacent the first end and a first wheel rotatably coupled to the caster housing; and a brake assembly connected to the frame and including a first shiftable brake stop, said stop being shiftable into and out of a braking position, wherein the stop engages the wheel, said brake assembly being spaced from the caster housing when the stop is in the braking position, said frame including a horizontal platform spaced between the first and second ends and operable to support a worker above the first end, said brake assembly including a handle vertically positioned between the platform and second end, and configured to cause the stop to shift into and out of the braking position.

19. A mobile scaffold comprising:

a first frame vertically elongated between first and second ends;

a first caster including a first caster housing rotatably coupled to the frame adjacent the first end and a first wheel rotatably coupled to the caster housing; and a brake assembly connected to the frame and including a first shiftable brake stop, said stop being shiftable into and out of a braking position, wherein the stop engages the wheel, said brake assembly being spaced from the caster housing when the stop is in the braking position, said brake stop including an endless wall, said wall encircling at least a portion of the caster housing when in the braking position, said wall presenting a lower surface that engages the wheel when in the braking position.

20. A mobile housing comprising:

a first frame vertically elongated between first and second ends;

a first caster including a first caster housing rotatably coupled to the frame adjacent the first end and a first wheel rotatably coupled to the caster housing; and a brake assembly connected to the frame, said brake assembly including a first brake stop presenting an enclosed wall defining an inner chamber, said stop being shiftable into and out of a braking position, wherein the stop engages the wheel and at least a portion of the caster housing is received within the inner chamber and spaced from the wall.

21. The mobile scaffold as claimed in claim 20, said wall presenting a lower engaging surface, said wall being shiftable into and out of the braking position, wherein the lower engaging surface engages the wheel.

22. The mobile scaffold as claimed in claim 21, said wall being endless, so as to encircle said at least a portion of the caster housing in the braking position.

23. The mobile scaffold as claimed in claim 22, said wall being cylindrical.

24. The mobile scaffold as claimed in claim 20, said stop being biased into the braking position.

25. The mobile scaffold as claimed in claim 20, said stop including a sleeve telescopically intercoupled with the frame.

26. The mobile scaffold as claimed in claim 25, said stop including a plurality of rollers configured to present a rolling engagement between the sleeve and frame.

27. The mobile scaffold as claimed in claim 20, said brake assembly further including a brake housing adjustably connected to the frame and shiftably coupled to the brake stop.

28. The mobile scaffold as claimed in claim 27, at least a portion of said brake housing being telescopingly interconnected with the frame.

29. The mobile scaffold as claimed in claim 20, said brake assembly further including an actuator in communication with the stop, said actuator being configured to cause the stop to shift into and out of the braking position.

30. The mobile scaffold as claimed in claim 29, said actuator including a shiftable handle spaced from the stop, said brake assembly including a housing connected to the frame, said housing including spaced upper and lower support members, said handle being pivotally coupled to the upper support member, said stop being shiftably coupled to the lower support member.

31. The mobile scaffold as claimed in claim 30, said upper and lower support members each being removably connected to the frame, said upper and lower support members being independently adjustable such that the stop and handle are separately adjustable relative to the frame.

32. The mobile scaffold as claimed in claim 29, said actuator including a pivotal L-shaped lever pivotally coupled to the stop and configured to shift the stop into and out of the braking position.

33. The mobile scaffold as claimed in claim 29, said actuator including a shiftable handle substantially spaced from the stop, said actuator further including a first cable interconnecting the handle and stop.

34. The mobile scaffold as claimed in claim 29, said actuator including a shiftable handle substantially spaced from the stop, said actuator further including a plunger intercommunicating the handle and stop.

35. The mobile scaffold as claimed in claim 20; and a second caster including a second caster housing rotatably coupled to the frame adjacent the lower end and a second wheel rotatably coupled to the second caster housing, said brake assembly including a second brake stop presenting an additional enclosed wall defining an additional open inner chamber, said second stop being shiftable into and out of a braking position, wherein the second stop engages the second wheel and at least a portion of the second caster housing is received within the additional inner chamber and spaced from the additional wall.

36. The mobile scaffold as claimed in claim 35, said brake assembly including a handle and first and second cables interconnecting the first and second stops to the handle.

37. The mobile scaffold as claimed in claim 35, said braking assembly including a handle, a linkage subassembly intercommunicating the first and second stops, and a plunger coupled between the handle and the linkage subassembly, said handle, linkage subassembly, and plunger cooperating to simultaneously shift the first and second stops into their respective braking positions.

38. The mobile scaffold as claimed in claim 37, said linkage subassembly including a first bar pivotally coupled to the plunger and a second bar pivotally coupled to the first bar and pivotally coupled to one of said first and second stops.

39. The mobile scaffold as claimed in claim 20, said frame including a horizontal platform spaced between the first and second ends and operable to support a worker above the first end, said brake assembly including a handle vertically positioned between the platform and second end, and configured to cause the stop to shift into and out of the braking position.

40. The mobile scaffold as claimed in claim 20;

a second caster including a second caster housing rotatably coupled to the frame adjacent the lower end and a second wheel rotatably coupled to the second caster housing; and a second brake assembly connected to the frame, and including a second shiftable brake stop presenting an additional enclosed wall defining an additional open inner chamber, said second stop being shiftable into and out of a braking position, wherein the second stop engages the second wheel and at least a portion of the second caster housing is received within the additional inner space and spaced from the additional wall.

41. A mobile scaffold comprising:

a frame vertically elongated between first and second ends;

a wheel coupled to the frame adjacent the first end, and rotatable about a central wheel axis and an upright axis, wherein said upright axis is substantially transverse to the central wheel axis; and a brake assembly fixed to the frame, and including a shiftable brake stop, said stop being shiftable into and out of a braking position, wherein the stop engages the wheel so that the wheel is generally prevented from rotating about the central wheel and upright axes, said stop including a sleeve telescopically intercoupled with the frame.

42. The mobile scaffold as claimed in claim 41, said axes being orthogonally intersecting.

43. The mobile scaffold as claimed in claim 41, said stop being biased into the braking position.

44. The mobile scaffold as claimed in claim 41, said brake assembly further including an actuator spaced from and in communication with the stop, said actuator being configured to cause the stop to shift into and out of the braking position.

45. The mobile scaffold as claimed in claim 44, said actuator further including a handle and a first cable interconnecting the handle and stop.

46. The mobile scaffold as claimed in claim 44, said actuator further including a handle and a plunger interconnecting the handle and stop.

47. The mobile scaffold as claimed in claim 41; and a second wheel coupled to the frame adjacent the first end, and rotatable about a second central wheel axis and a second upright axis, wherein said second upright axis is substantially transverse to the second central wheel axis, said brake assembly including a second shiftable brake stop, said second stop being shiftable into and out of a braking position, wherein the second stop engages the second wheel so that the second wheel is generally prevented from rotating about the second central wheel and second upright axes.

48. The mobile scaffold as claimed in claim 41;

a second wheel coupled to the frame adjacent the first end, and rotatable about a second central wheel axis and a second upright axis, wherein said second upright axis is substantially transverse to the second central wheel axis; and a second shiftable brake assembly fixed to the frame, and configured to engage the second wheel so as to prevent the second wheel from rotating about the central wheel and upright axes.

49. A mobile scaffold comprising:

a frame vertically elongated between first and second ends;

a wheel coupled to the frame adjacent the first end, and rotatable about a central wheel axis and an upright axis, wherein said upright axis is substantially transverse to the central wheel axis; and a brake assembly fixed to the frame, and including a shiftable brake stop, said stop being shiftable into and out of a braking position, wherein the stop engages the wheel so that the wheel is generally prevented from rotating about the central wheel and upright axes, said stop including a plurality of rollers configured to present a rolling engagement between the stop and frame.

50. A mobile scaffold comprising:

a frame vertically elongated between first and second ends;

a wheel coupled to the frame adjacent the first end, and rotatable about a central wheel axis and an upright axis, wherein said upright axis is substantially transverse to the central wheel axis; and a brake assembly fixed to the frame, and including a shiftable brake stop, said stop being shiftable into and out of a braking position, wherein the stop engages the wheel so that the wheel is generally prevented from rotating about the central wheel and upright axes, said brake assembly further including an adjustable housing shiftably connected to the frame and coupled to the brake stop.

51. The mobile scaffold as claimed in claim 50,
at least a portion of said housing being telescopingly interconnected with the frame.
52. A mobile scaffold comprising:
a frame vertically elongated between first and second ends;
a wheel coupled to the frame adjacent the first end, and rotatable about a central wheel axis and an upright axis, wherein said upright axis is substantially transverse to the central wheel axis; and
a brake assembly fixed to the frame, and including a shiftable brake stop,
said stop being shiftable into and out of a braking position, wherein the stop engages the wheel so that the wheel is generally prevented from rotating about the central wheel and upright axes,
said brake assembly further including an actuator spaced from and in communication with the stop,
said actuator being configured to cause the stop to shift into and out of the braking position,
said actuator including a shiftable handle substantially spaced from the stop,
said braking assembly including a housing connected to the frame,
said housing including an upper support member further connected to the handle and a first lower support member further connected to the stop.
53. The mobile scaffold as claimed in claim 52,
said upper and lower support members being adjustable, such that the brake stop and handle are separately adjustable relative to the frame.
54. The mobile scaffold as claimed in claim 52,
said handle including a pivotal L-shaped lever pivotally coupled to the stop and configured to shift the stop into and out of the braking position.
55. A mobile scaffold comprising:
a frame vertically elongated between first and second ends:
a wheel coupled to the frame adjacent the first end, and rotatable about a central wheel axis and an upright axis, wherein said upright axis is substantially transverse to the central wheel axis;
a brake assembly fixed to the frame, and including a shiftable brake stop,
said stop being shiftable into and out of a braking position, wherein the stop engages the wheel so that the wheel is generally prevented from rotating about the central wheel and upright axes; and
a second wheel coupled to the frame adjacent the first end, and rotatable about a second central wheel axis and a second upright axis, wherein said second upright axis is substantially transverse to the second central wheel axis,
said brake assembly including a second shiftable brake stop,
said second stop being shiftable into and out of a braking position, wherein the second stop engages the second wheel so that the second wheel is generally prevented from rotating about the second central wheel and second upright axes,
said brake assembly further including an actuator in communication with said first and second stops,
said actuator being configured to cause the stops to shift into and out of the braking position.
56. The mobile scaffold as claimed in claim 55,
said actuator including a handle, and first and second cables interconnecting the first and second stops to the handle, such that the first and second stops are concurrently shiftable by the handle.
57. A mobile scaffold comprising:
a frame vertically elongated between first and second ends;
a wheel coupled to the frame adjacent the first end, and rotatable about a central wheel axis and an upright axis, wherein said upright axis is substantially transverse to the central wheel axis;
a brake assembly fixed to the frame, and including a shiftable brake stop,
said stop being shiftable into and out of a braking position, wherein the stop engages the wheel so that the wheel is generally prevented from rotating about the central wheel and upright axes; and
a second wheel coupled to the frame adjacent the first end, and rotatable about a second central wheel axis and a second upright axis, wherein said second upright axis is substantially transverse to the second central wheel axis,
said brake assembly including a second shiftable brake stop,
said second stop being shiftable into and out of a braking position, wherein the second stop engages the second wheel so that the second wheel is generally prevented from rotating about the second central wheel and second upright axes,
said braking assembly including a handle, a linkage subassembly intercommunicating the first and second stops, and a plunger coupled between the handle and the linkage subassembly,
said handle, linkage subassembly, and plunger cooperating to simultaneously shift the first and second stops into their respective braking positions.
58. The mobile scaffold as claimed in claim 57,
said linkage subassembly including a first bar pivotally coupled to the plunger and a second bar pivotally coupled to the first bar and pivotally coupled to one of said first and second stops.
59. A mobile scaffold comprising:
a frame vertically elongated between first and second ends;
a wheel coupled to the frame adjacent the first end, and rotatable about a central wheel axis and an upright axis, wherein said upright axis is substantially transverse to the central wheel axis; and
a brake assembly fixed to the frame, and including a shiftable brake stop,
said stop being shiftable into and out of a braking position, wherein the stop engages the wheel so that the wheel is generally prevented from rotating about the central wheel and upright axes,
said frame including a horizontal platform spaced between the first and second ends and operable to support a worker above the first end,
said brake assembly including a handle vertically positioned between the platform and second end, and configured to shift the stop into and out of the braking position.
60. A brake assembly for use with a mobile scaffold having a frame presenting upper and lower ends, and first and second wheels coupled to the frame near the lower end, wherein said wheels are each rotatable about a first axis and a second axis that is substantially transverse to the first axis, said brake assembly comprising:
a housing connectable to the frame;
a first shiftable brake stop coupled to the housing; and an actuator configured to cause the stop to shift into and out of a braking position, wherein the stop engages the first wheel and prevents the first wheel from rotating about said first and second axes.

61. The brake assembly as claimed in claim 60, said stop including an endless wall presenting a serrated lower surface.

62. The brake assembly as claimed in claim 60, said actuator including a biasing element operable to bias said stop into the braking position.

63. The brake assembly as claimed in claim 62, said biasing element including a pneumatic cylinder.

64. The brake assembly as claimed in claim 60, said housing being removably and adjustably coupled to the frame.

65. The brake assembly as claimed in claim 60, said actuator including a shiftable handle substantially spaced from the stop, said housing including an upper support member connected to the handle and connectable to the frame, and a first lower support member connected to the stop and connectable to the frame.

66. The brake assembly as claimed in claim 65, said upper and lower support members each being adjustably connectable to the frame, such that the brake stop and handle are separately adjustable relative to the frame.

67. The brake assembly as claimed in claim 65, said handle including a pivotal L-shaped lever pivotally coupled to the stop and configured to shift the stop into and out of the braking position.

68. The brake assembly as claimed in claim 65, said actuator further including a first cable interconnecting the handle and first stop.

69. The brake assembly as claimed in claim 65, said actuator further including a plunger interconnecting the handle and first stop.

70. The brake assembly as claimed in claim 60; and a second shiftable brake stop fixedly connected to the housing, said actuator being configured to cause the second stop to shift into and out of a braking position, wherein the second stop engages the second wheel and prevents the second wheel from rotating about said first and second axes.

71. The braking assembly as claimed in claim 70, said actuator including a shiftable handle substantially spaced from the stop, and first and second cables interconnecting the first and second stops to the handle.

72. The braking assembly as claimed in claim 70, said actuator including a handle, a linkage subassembly intercommunicating the first and second stops, and a plunger coupled between the handle and the linkage subassembly, said handle, linkage subassembly, and plunger cooperating to simultaneously shift the first and second stops into their respective braking positions.

73. The braking assembly as claimed in claim 72, said linkage subassembly including a first bar pivotally coupled to the plunger and a second bar pivotally coupled to the first bar and pivotally coupled to one of said first and second stops.

* * * * *